US010284901B2

(12) United States Patent
Oguchi et al.

(10) Patent No.: US 10,284,901 B2
(45) Date of Patent: May 7, 2019

(54) NON-TRANSITORY COMPUTER-READABLE STORAGE MEDIUM, AND DISPLAY CONTROL DEVICE

(71) Applicant: FUJITSU LIMITED, Kawasaki-shi, Kanagawa (JP)

(72) Inventors: Atsushi Oguchi, Kawasaki (JP); Hideo Kamada, Yokohama (JP); Tatsuma Muramatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 15/460,999

(22) Filed: Mar. 16, 2017

(65) Prior Publication Data
US 2017/0280190 A1    Sep. 28, 2017

(30) Foreign Application Priority Data

Mar. 24, 2016  (JP) .................................. 2016-060957

(51) Int. Cl.
  *H04N 21/431*    (2011.01)
  *G11B 27/34*     (2006.01)
  (Continued)

(52) U.S. Cl.
  CPC ......... *H04N 21/4316* (2013.01); *A63F 13/00* (2013.01); *A63F 13/53* (2014.09);
  (Continued)

(58) Field of Classification Search
  CPC ............................ H04N 21/4316; A63F 13/53
  See application file for complete search history.

(56) References Cited

U.S. PATENT DOCUMENTS

2001/0016847 A1*  8/2001  Suzuki ............... A63B 24/0003
2009/0019504 A1   1/2009  Huang et al.
                          (Continued)

FOREIGN PATENT DOCUMENTS

| JP | 2001-229195 A | 8/2001 |
| KR | 20090004261 A | 1/2009 |
| TW | 200904193 A | 1/2009 |

OTHER PUBLICATIONS

Office Action dated Nov. 16, 2017, issued in counterpart Taiwanese Application No. 106107544, with English translation (11 pages).
(Continued)

*Primary Examiner* — Girumsew Wendmagegn
(74) *Attorney, Agent, or Firm* — Westerman, Hattori, Daniels & Adrian, LLP

(57) ABSTRACT

A non-transitory computer-readable storage medium storing a display control program that causes a computer to execute a process including, in response to a selection of a retrieval item from a plurality of retrieval items, displaying an input area of a retrieval condition corresponding to the selected retrieval item, displaying, in an area different from the input area, a retrieval result retrieved according to a retrieval condition entered in the input area, while maintaining the display of the input area, receiving a selection of any content from a plurality of contents included in the retrieval results, and in response to the selection, displaying an reproduction area that reproduces an image or a video image corresponding to the selected content while maintaining the display of the retrieval results, the reproduction area overlapping at least a part or a whole of the input area.

10 Claims, 24 Drawing Sheets

(51) Int. Cl.
    *H04N 21/432*     (2011.01)
    *H04N 21/81*     (2011.01)
    *A63F 13/00*     (2014.01)
    *A63F 13/812*     (2014.01)
    *A63F 13/53*     (2014.01)

(52) U.S. Cl.
    CPC ............ *A63F 13/812* (2014.09); *G11B 27/34* (2013.01); *H04N 21/432* (2013.01); *H04N 21/8133* (2013.01)

(56) References Cited

U.S. PATENT DOCUMENTS

| | | | |
|---|---|---|---|
| 2009/0096939 A1 | 4/2009 | Nomizo | |
| 2011/0246889 A1* | 10/2011 | Moore | G06Q 10/04 715/719 |
| 2012/0062590 A1 | 3/2012 | Morohoshi et al. | |

OTHER PUBLICATIONS

Office Action dated Sep. 18, 2018, issued in counterpart Korean application No. 10-2017-0035479 with English translation. (10 pages).

* cited by examiner

FIG. 2

| PLAYER ID | PLAYER'S NAME | TEAM | POSITION | UNIFORM NUMBER | PITCHING/BATTING METHOD | PICTURE | 23 |
|---|---|---|---|---|---|---|---|
| ... | ... | | | | | | ... |
| 0101 | XXXX | A | PITCHER | 14 | RIGHT-HANDED | 0101.jpg | |
| 0231 | YYYY | B | FIELDER | 3 | RIGHT-HANDED | 0231.jpg | |
| ... | ... | | | | | | |

FIG. 3

| USER ID | USER ID OF FOLLOW TARGET | | |
|---|---|---|---|
| ... | | | |
| 0231 | 0023 | 0486 | ... |
| ... | | | |

| FILE NAME | PITCH TAG (FRAME TIME) | GAME DATE | INNING | FIELDING TEAM | PITCHER | BATTING TEAM | BATTER | BATTING ORDER |
|---|---|---|---|---|---|---|---|---|
| ... | | | | | | | | |
| 20160325AB | xxx.x | 2016.03.25 | TOP OF FIRST | A | XXXX | B | YYYY | 1 |
| 20160325AB | xxx.x | 2016.03.25 | TOP OF FIRST | A | XXXX | B | YYYY | 1 |
| 20160325AB | xxx.x | 2016.03.25 | TOP OF FIRST | A | XXXX | B | ZZZZ | 2 |
| 20160325AB | xxx.x | 2016.03.25 | TOP OF FIRST | A | XXXX | B | RRRR | 3 |
| ... | | | | | | | | |

| PITCH RESULT | AT-BAT RESULT | PITCHING COURSE | PITCH TYPE | HITTING DIRECTION | COUNT | RUNNER |
|---|---|---|---|---|---|---|
| ... | | | | | | |
| BALL | – | 25 | CURVE | – | (1,2,1) | (0,0,0) |
| – | RIGHT SINGLE HIT | 18 | SPLITTER | CF | (2,2,1) | (0,0,0) |
| CALLED STRIKE | STRIKEOUT | 16 | SPLITTER | LF | (0,0,1) | (0,0,0) |
| SWING AND MISS | – | 3 | STRAIGHT | – | (0,0,2) | (1,0,0) |
| ... | | | | | | |

FIG. 5

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

| FIELDER | AT-BAT RESULT BREAKDOWN | | | HITTING DIRECTION BREAKDOWN | | | COURSE-BASED BATTING AVERAGE | | | PITCH TYPE-BASED BATTING AVERAGE | | |
|---|---|---|---|---|---|---|---|---|---|---|---|---|
| | HIT | OUT | ... | LH | CH | ... | 1 | 2 | ... | STRAIGHT | 2-SEAM | ... |
| ... | | | | | | | | | | | | |
| YYYY | .314 | .538 | ... | 9 | 4 | ... | .000 | 1.00 | ... | .402 | .400 | ... |
| ... | | | | | | | | | | | | |

| PITCHER | AT-BAT-BASED PITCH RESULT BREAKDOWN | | | SITUATION BASED BATTED AVERAGE | | | COURSE-BASED BATTED AVERAGE | | | PITCH TYPE-BASED BATTED AVERAGE | | |
|---|---|---|---|---|---|---|---|---|---|---|---|---|
| | HIT | OUT | ... | 1 OUT | 2 OUT | ... | 1 | 2 | ... | STRAIGHT | | ... |
| ... | | | | | | | | | | | | |
| XXXX | .273 | .636 | ... | .269 | .197 | ... | .000 | .333 | ... | .206 | .000 | ... |
| ... | | | | | | | | | | | | |

FIG. 8

| GAME DATE | HOME TEAM | VISITOR TEAM | HOME SCORE | VISITOR SCORE | INNING-BASED SCORE | WINNING PITCHER | LOSING PITCHER |
|---|---|---|---|---|---|---|---|
| ... | ... | | | | | | |
| 2016.03.25 | A | B | 3 | 0 | (B,0,0,0,...; A,0,0,0,...,) | XX | W |
| ... | ... | | | | | | |

| TOP PAGE | RETRIEVAL AND REPRODUCTION | PERSONAL RESULT | GAME LOG |

PITCHER TEAM A
14/RIGHT-HANDED
XX XX
SELECT

AT-BAT-BASED PITCH RESULT BREAKDOWN 63E
FOUR BALLS/HBP
HIT
OUT

HIT .273
OUT .636
FOUR BALLS/HBP 0.91
SACRIFICE BUNT 0.06
OTHERS 0.19

COURSE-BASED BATTED AVERAGE 63G

| .000 | .000 | .000 | .000 | .000 |
| .000 | .333 | .417 | .188 | .000 |
| .000 | .200 | .278 | .286 | .250 | .143 |
| .000 | .238 | .160 | .208 | .182 |
| .000 | .000 | .083 | .000 | .000 |

PITCH TYPE-BASED BATTED AVERAGE 63H
STRAIGHT .206
2-SEAM .000
SPLITTER .000
CHANGE-UP .116
CUTTER .000
CURVE .289
SLIDER .270
SINKER .000
SPECIAL TYPE BALL .000
0.0  0.5  1.0

SITUATION-BASED BATTED AVERAGE 63F

○○ .269 ONE OUT
●● .197 TWO OUTS

◇◇ .169 NO RUNNER
◆◇ .350 RUNNER IN SCORING POSITION
◆◆ .600 BASES LOADED

◆◇ .220 RUNNER ON FIRST BASE
◆◇ .313 RUNNER ON SECOND BASE
◆◇ .500 RUNNER ON THIRD BASE

◆◆ .300 RUNNERS ON FIRST AND SECOND BASES
◆◆ .200 RUNNERS ON FIRST AND THIRD BASES
◆◆ .500 RUNNERS ON SECOND AND THIRD BASES

FIG. 19

| TOP PAGE | RETRIEVAL AND REPRODUCTION | PERSONAL RESULT | GAME LOG |

GAME DATE: 2016.03.25 ▽ SELECT

TEAM A 3 VS 0 TEAM B
[WINNING] XX [S] [DEFEATED] VV
[HR] YY (BOTTOM OF 6TH)

|  |  | 1 | 2 | 3 | 4 | 5 | 6 | 7 | 8 | 9 | TOTAL |
|---|---|---|---|---|---|---|---|---|---|---|---|
| TEAM B |  | 0 | 0 | 0 | 0 | 0 | 0 | 0 | 0 | 0 | 0 |
| TEAM A |  | 0 | 0 | 1 | 0 | 0 | 0 | 2 | 0 | X | 3 |

| BATTING ORDER | BATTER | 1 | 2 | 3 | 4 | 5 | 6 | 7 | 8 | 9 |
|---|---|---|---|---|---|---|---|---|---|---|
| 1 | AA | CENTER FLY |  |  | LEFT SINGLE HIT |  | STRIKEOUT |  |  | RIGHT FLY |
| 2 | BB | THIRD GROUNDBALL |  |  | CENTER SINGLE HIT |  | SHORT LINER | PITCHER GROUNDBALL |  | THREE STRIKES |
| 3 | CC | STRIKEOUT | SHORT FLY |  | SECOND GROUNDBALL |  |  | STRIKEOUT |  |  |
| 4 | DD |  | THIRD GROUNDBALL |  | SECOND GROUNDBALL |  |  |  |  |  |
| 5 | EE |  |  |  | RIGHT FLY |  |  | SECOND GROUNDBALL |  |  |
| (5) | FF |  | THIRD GROUNDBALL |  |  | THREE STRIKES |  |  |  |  |
| 6 | GG |  |  | CENTER FLY |  | SECOND GROUNDBALL |  |  | CENTER FLY |  |
| 7 | HH |  |  | THIRD GROUNDBALL |  | LEFT FLY |  |  | THIRD GROUNDBALL |  |
| 8 | II |  |  |  |  |  |  |  | STRIKEOUT |  |

NON-TRANSITORY COMPUTER-READABLE STORAGE MEDIUM, AND DISPLAY CONTROL DEVICE

CROSS-REFERENCE TO RELATED APPLICATION

This application is based upon and claims the benefit of priority of the prior Japanese Patent Application No. 2016-060957, filed on Mar. 24, 2016, the entire contents of which are incorporated herein by reference.

FIELD

The embodiments discussed herein are related to a non-transitory computer-readable storage medium, and a display control device.

BACKGROUND

Video picture data processing systems for extracting the video image of a desired scene from a large volume of video picture data have been proposed. In this system, video picture data segmented in time series for each of the desired scenes (in a pitch delivery unit in a baseball game, for example) of a subject is associated with corresponding retrieval data of various kinds, and stored as a video picture database. Desired video picture data is extracted from the video picture database.

CITATION LIST

Patent Literature

[PATENT LITERATURE 1] Japanese Laid-open Patent Publication No. 2001-229195

SUMMARY

According to an aspect of the invention, a non-transitory computer-readable storage medium storing a display control program that causes a computer to execute a process, the process including, in response to a selection of a retrieval item from a plurality of retrieval items, displaying, on a display screen, an input area of a retrieval condition corresponding to the selected retrieval item, displaying, in an area different from the input area on the display screen, a retrieval result retrieved according to a retrieval condition entered in the input area, while maintaining the display of the input area, receiving a selection of any content from a plurality of contents included in the displayed retrieval results, and in response to the selection of the content, displaying a reproduction area that reproduces an image or a video image corresponding to the selected content while maintaining the display of the retrieval results, the reproduction area overlapping at least a part or a whole of the input area, the input area being hidden in response to displaying the reproduction area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a player information table;

FIG. 3 illustrates an example of an inter-user correspondence information table;

FIG. 4 illustrates an example of a pitching meta data table;

FIG. 5 is a diagram for illustrating a pitching course;

FIG. 7 illustrates an example of a result information table;

FIG. 8 illustrates an example of a game information table;

FIG. 13 illustrates an example of a retrieval and reproduction screen where a narrowing condition entry area for entering the pitching course is indicated;

FIG. 15 illustrates an example of a retrieval and reproduction screen where a narrowing condition entry area for entering the hitting direction is displayed;

FIG. 18 illustrates an example of a personal result screen when the target player is a pitcher;

FIG. 19 illustrates an example of a game log screen;

DESCRIPTION OF EMBODIMENTS

One aspect of the present disclosure has an object to improve operability in retrieval of an image or a video image.

Hereinafter, an embodiment according to the present disclosure is described in detail with reference to the accompanying drawings. The embodiment is described by taking as an example a case where a retrieval target video image is a baseball game video image.

Figure 1:
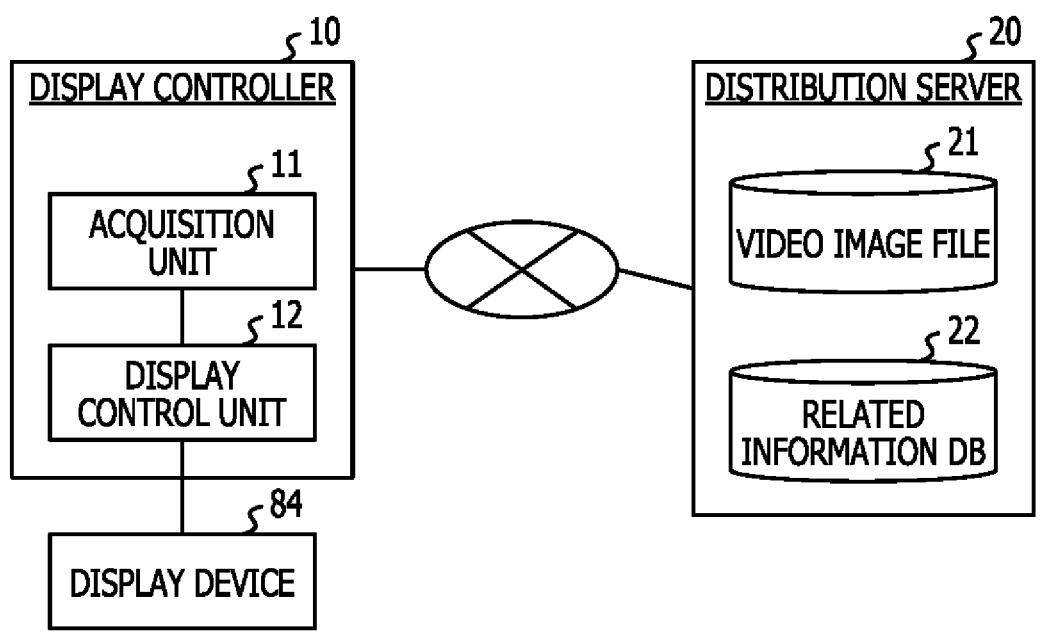
FIG. 1 is a functional block diagram illustrating a schematic configuration of a display controller according to an embodiment.

As illustrated in FIG. 1, a display controller 10 according to the embodiment is coupled with a distribution server 20 configured to distribute a baseball game video image via a network or the like, and performs display control when a video image acquired from the distribution server 20 is reproduced by a display device 84.

The distribution server 20 stores a video image file 21 indicating video images of captured baseball games. In the embodiment, one video image file 21 is provided for each game. Each video image file 21 is managed in a uniquely identifiable manner such that the video image file 21 is assigned with a file name using the game date and the playing teams in the game recorded in the video image file 21. For example, a video image file 21 of a game between Team A and Team B held on Apr. 10, 2016 may be assigned with a file name such as "20160410AB".

Each video image file 21 is a video image captured at a frame rate of, for example, such as 30 fps or 60 fps, and includes multiple frames. Each frame is associated with a frame time represented by a time elapsed since the start of capturing, and the frame time is used as identification information of each frame.

In the video image file 21, a section indicating a segment in the play is assigned with information indicating the segment in the play. In the embodiment, with every pitch of the pitcher is set as a segment of the play, and a "pitch tag" is assigned at a section indicating the start of the pitch by the pitcher. More specifically, the pitch tag is assigned, for example, to a frame at a predetermined time before (for example, 3 seconds before) the start of the pitching motion of the pitcher among frames included in the video image file 21.

The distribution server 20 stores a related information database (DB) 22 in which various information related to the video image file 21 is stored. In the embodiment, the related information DB 22 includes a player information table, an inter-user correspondence information table, a pitching meta data table, a result information table, and a game information table. The related information DB 22 also may include other information related to the video image file 21. Hereinafter, tables of the related information DB 22 are described.

The player information table is a table in which player information being information of each player is stored. FIG. 2 illustrates an example of a player information table 23. In the example of FIG. 2, each row (each record) indicates player information for one player. Each record of player information includes information such as "player ID" for uniquely identifying the player, "player's name", "team" which is the team name of a team to which the player belongs, "position", "uniform number", "pitching/batting method", and "picture". "Position" is information from which at least the player is identifiable as a pitcher or a fielder. For the fielder, the infielder or the outfielder may be used as identifiable information, or more specific position such as the catcher, first baseman, and left fielder may be used as identifiable information. "Pitching/batting method" is information indicating, when the player is a pitcher, whether the player is right-handed or left-handed for pitching, and, when the player is a fielder, information indicating whether the player is right-handed (right batter's box) or left-handed (left batter's box) for batting. "Picture" is image data such as a face photograph of the player.

The inter-user correspondence information table is a table which stores information indicating a correspondence relationship among users utilizing the application provided by the embodiment. The correspondence relationship among users in the embodiment is, for example, an association among users such as a relationship between a follow and a follower in Twitter (registered trademark). Although described in detail below, when information for the log-in user is provided on the top page displayed first when the user logs in this application, information related to the user whom the log-in user follows is also provided.

FIG. 3 illustrates an example of an inter-user correspondence information table 24. In the example of FIG. 3, the user ID of a user whom a user represented by the user ID follows is stored for each of user IDs by associating as "follow target user ID". When the user utilizing the application is a player registered in the player information table 23, the user ID is the player ID.

The pitching meta data table is a table which stores pitching meta data being meta data of each pitch scene. Each pitch scene is represented, for each "pitch tag" assigned to the video image file 21, by a group of frames starting from a frame to which the pitch tag is assigned and ending at a frame preceding a frame to which a next pitch tag is assigned.

FIG. 4 illustrates an example of a pitching meta data table 25. In the example of FIG. 4, each row (each record) indicates pitching meta data on the pitch scene of every pitch. In each record of pitching meta data, "file name" for identifying the video image file 21, a frame time to which "pitch tag" is assigned, and information on the pitch scene starting from a frame to which the pitch tag is assigned are associated with each other. Information on the pitch scene includes information such as "game date", "inning", "fielding team", "pitcher", "batting team", "batter", "batting order", "pitch result", "at-bat result", "pitching course", "pitch type", "hitting direction", "count", and "runner".

"Game date" is a date when a game including the pitch scene thereof is held. "Inning" is an inning (a top of the first inning, a bottom of the first inning, a top of the second inning, etc.) at the time of a pitch presented in the pitch scene. "Fielding team" is a team to which a pitcher performing the pitch indicated by the pitch scene belongs, and "pitcher" is information such as the player ID and player's name for identifying the pitcher. "batting team" is a team to which a batter at the time of the pitch presented in the pitch scene belongs, and "batter" is information such as the player ID and player's name for identifying the batter. "Batting order" is a batting order (1, 2, . . . , 9) of batters at the time of the pitch presented in the pitch scene.

"Pitch result" is information indicating that result of the pitch in the pitch scene is strike or ball. The strike may be more specific information from which swing and miss, called strike or foul is identifiable. When a batter hits the pitched ball (except for the foul) or when the pitch is not judged as strike or ball, "pitch result" is left blank (in the example of FIG. 4, represented by "-").

"At-bat result" is a result of the at-bat assigned when a pitch indicated by the pitch scene is a last pitch in the at-bat including the pitch, such as, for example, hit, out or others. More specifically, the hit may be a single, a double, a triple, or a home run as identifiable information, and the out may be a single out, double play or strikeout as identifiable information. More specifically, the hit may be a result of combination of the hitting direction and the rise of hit ball such as a hit to a center and a fly to a right field. Others include, for example, four balls, hit by pitch, sacrifice bunt, sacrifice fly, error, fielder's choice, catcher's interference, fielder's interference, obstruction, and so on. When a pitch included in the pitch scene is not a last pitch in the at-bat including the pitch, "at-bat result" is left blank (in the example of FIG. 4, represented by "-".

Figure 6:
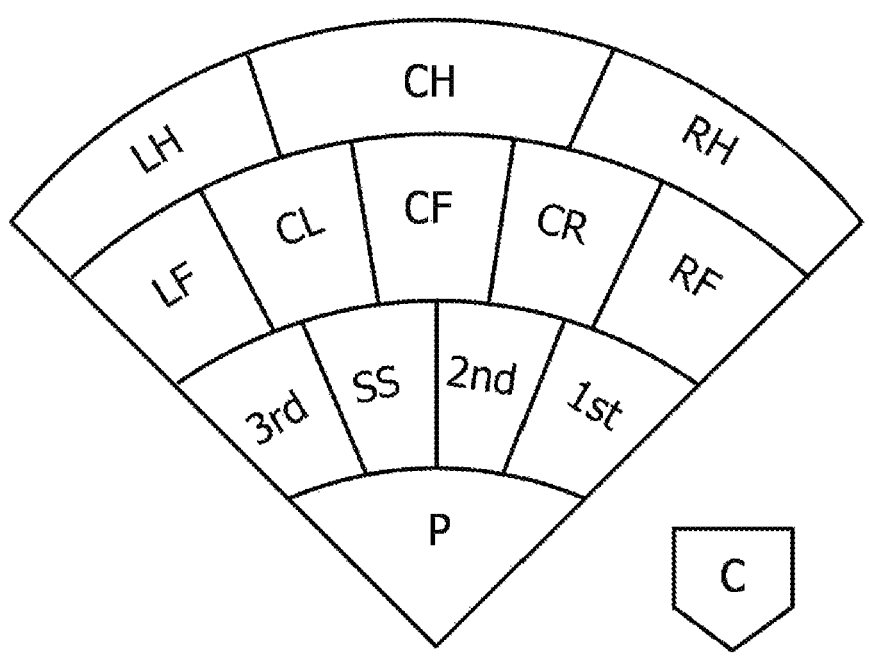
FIG. 6 is a diagram for illustrating a hitting direction.

"Pitching course" is a course (zone) where the pitched ball indicated by the pitch scene has passed. "Pitching course" may be represented by the number of the block where the pitched ball has passed through, for example, by dividing the strike zone and peripheral zones thereof into multiple blocks and assigning a number to each of the blocks as illustrated in FIG. 5. "Pitch type" is information indicating the pitch type of the pitch indicated by the pitch scene, such as, for example, straight, 2-seam, splitter, change-up, cutter, curve, slider, sinker, and other special types. "Hitting direction" is a direction of the ball hit by a batter against the pitched ball indicated by the pitch scene. "Hitting direction" may be represented by the symbol of the block where the hit ball has reached, for example, by dividing the ground into multiple blocks and assigning a symbol to each of the blocks as illustrated in FIG. 6.

"Count" is the count of balls, strikes, and outs at the starting time of the pitch scene, represented in the format of "(ball count, strike count, out count)". For example, 3 balls, 1 strike and 2 outs are represented by "(3, 1, 2)". "Runner" indicates states of runners at the starting time of the pitch scene represented in the format of "(presence or absence of first runner, presence or absence of second runner, presence or absence of third runner)". For example, presence of the runner is represented by "1" and absence of the runner is represented by "0". Presence of the runner only on the first base is represented by "(1, 0, 0)".

The result information table is a table in which results depending on the states of each of players are stored. The result information table stores, for example, total results from the start of the season to the last game. FIG. 7 illustrates an example of the result information table 26. In the example of FIG. 7, various results for both the case where the player is a fielder and the case where the player is a pitcher are stored.

In the case where the player is a fielder, "at-bat result breakdown", "hitting direction breakdown", "course-based batting average", and "pitch type-based batting average" are stored. "At-bat result breakdown" is the ratios of hit and out per at-bat result, "hitting direction breakdown" is, for example, the number of hits in each of the hitting directions as illustrated in FIG. 6, "course-based batting average" is, for example, the batting average in each of the pitching courses as illustrated in FIG. 5, and "pitch type-based batting average" is the batting average in each of the pitch types. In the same manner, in the case where the player is a pitcher, "at-bat-based pitch result breakdown", "course-based batted average", and "pitch type-based batted average" are stored. In the case of the pitcher, the result is an at-bat-based pitch result or batted average. In the case where the player is a pitcher, runner state and "situation based batted average" indicating the ball count-based batted average are also stored as the result. Various results are not limited to those examples, and may include a batting average and a batted average for each of opponent teams, a batting average based on the throwing method of the pitcher (right-handed or left-handed), and a batted average based on the hitting method of the batter (right-handed hitting or left-handed hitting), and so on. Also, the result of the fielder may include the record of the situation-based batting average, and the result of the pitcher may include the hit direction breakdown.

The game information table is a table in which game information indicating the overview of each game is stored. FIG. 8 illustrates an example of the game information table 27. In the example of FIG. 8, each row (each record) indicates game information for one game. Each row of game information includes information of "game date" when the game was held, "home team" and "visitor team" as playing teams in the game, and "home score" and "visitor score" indicating final scores of respective teams. The game information also includes information such as "inning-based score" indicating the score in each inning, and "winning pitcher" and "losing pitcher" in the game. Further, information such as the relief pitcher and the home run also may be included.

The display controller 10 includes an acquisition unit 11 and a display control unit 12 in terms of the function.

The acquisition unit 11 receives the user ID of the user who logs in the application provided by the embodiment and transmits the user ID to a distribution server 20. The acquisition unit 11 acquires top page information transmitted from the distribution server 20 as information to be displayed on the top page displayed first after user's log-in. In the case where the user ID of the log-in user is a player ID, the top page information includes player information for the player ID, the player information being extracted from the player information table 23.

The top page information also includes a thumbnail image generated in any frame of a predetermined pitch scene included in the video image file 21, and pitching meta data of the pitch scene. The predetermined pitch scene includes, for example, pitch scenes for last several games of the log-in user (player), pitch scenes for last several games of a user (player) whom the log-in user follows, and a pitch scene assigned with a message from the other user. Also, the top page information may include information not associated with the video image file 21, for example, such as a meeting document. The acquisition unit 11 delivers the acquired top page information to the display control unit 12.

The acquisition unit 11 receives the retrieval condition of the video image from the log-in user, transmits the received retrieval condition to the distribution server 20, and thereby requests distribution of the video image. Thus, the distribution server 20 identifies, with the received retrieval condition as a key, a pitch scene matching the retrieval condition out of the pitching meta data table 25. Then, the distribution server 20 distributes a video image file 21 including the identified pitch scene and pitching meta data of the identified pitch scene to the display controller 10. The acquisition unit 11 acquires the video image file 21 and pitching meta data distributed from the distribution server 20 and delivers the acquired video image file 21 and pitching meta data to the display control unit 12.

When the personal result screen (described below in detail) is selected by the log-in user, the acquisition unit 11 transmits the player ID of the player entered on the personal result screen to the distribution server 20 and thereby requests result information of the entered player. Then, the acquisition unit 11 acquires result information of the entered player which is extracted from the result information table 26 and transmitted from the distribution server 20, and delivers the acquired result information to the display control unit 12.

When the game log screen (described below in detail) is selected by the log-in user, the acquisition unit 11 transmits the entered game date to the distribution server 20 and thereby requests game information of the entered game date for the team to which the log-in user belongs. Then, the acquisition unit 11 acquires game information of the entered game date which is extracted from the game information table 27 and transmitted from the distribution server 20, and delivers the acquired game information to the display control unit 12.

The display control unit 12 controls screen display to a display device 84 based on information delivered from the acquisition unit 11 and operation of the log-in user.

Figure 9:
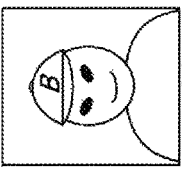
FIG. 9 illustrates an example of a top page screen.

More specifically, upon receiving the top page information from the acquisition unit 11, the display control unit 12 displays, for example, a top page screen 40 as illustrated in FIG. 9 on the display device 84. The top page screen 40 includes a top page tab 31 for switching the screen displayed on the display device 84, a retrieval and reproduction tab 32, a personal result tab 33, and a game log tab 34. The top page screen 40 is a screen in a state where the top page tab 31 is selected. The top page screen 40 includes a log-in user display area 41, a recent at-bat display area 42, and a time line display area 43.

The display control unit 12 displays, based on the player information of the log-in user delivered from the acquisition unit 11, player's name, team, position, uniform number, throwing method or hitting method, and picture of the log-in user, in the log-in user display area 41. In the case where the log-in user is not a player, name, title (director, coach, staff, etc.), and picture of the log-in user may be managed in a table (not shown) similar with the player information table 23, and those information may be displayed in the log-in user display area 41.

The display control unit 12 displays, based on pitching meta data of the pitch scene for last several games of the log-in user delivered from the acquisition unit 11, the at-bat result for a predetermined number of at-bats in the descending order from a latest at-bat, in the recent at-bat display area 42. For example, in the example of FIG. 9, the display control unit 12 displays, for each at-bat, the date, inning, opponent team, opponent pitcher or opponent batter, and at-bat result in each of frames. When a frame indicating any at-bat is selected from the recent at-bat display area 42, the display control unit 12 delivers the pitching meta data used for displaying information of the selected at-bat to the acquisition unit 11 as the retrieval condition.

The display control unit 12 generates the performance card based on the thumbnail image and pitching meta data delivered from the acquisition unit 11. The performance card provides information recommended to the log-in user such as performance of the game in which the log-in user played and performance of the game in which a user followed by the log-in user played, in a card format. The performance card indicates a thumbnail image of the pitch scene and predetermined information extracted from the pitching meta data. The predetermined information is different depending on whether the target player (log-in user or user followed by log-in user) of the performance card is a pitcher or a fielder. More specifically, in the case where the target player of the performance card is a fielder, the predetermined information may be, for example, the at-bat result of each at-bat. In the case where the target player of the performance card is a pitcher, the predetermined information may be, for example, the opponent team. Since most of fielders play in almost every game, the performance card of the game may be easily recognized by indicating the at-bat result for each of games. Since the pitcher, especially a starting pitcher, does not play in every game, the performance card of the game may be more easily recognized by indicating the opponent team rather than by indicating such as the pitch result of each pitch in the game, for example.

In the case where the message is assigned with the pitch scene, the display control unit 12 generates a performance card including a thumbnail image of the pitch scene and the message. The display control unit 12 also generates a performance card for other information included in the top page information. For example, in the case where a meeting document is included in the top page information, the display control unit 12 may generate a performance card which describes the date when the meeting is held, with the meeting document attached thereto.

The display control unit 12 displays the generated performance card in the time line display area 43 by arranging, in the descending order, dates relevant to the performance card such as, for example, date of the game indicated by the performance card, date included in the message, and date when the meeting is held. For example, in the example of FIG. 9, performance cards 44A and 44E are performance cards indicating performance of games in which the log-in user played. The performance card 44A is a performance card of a last game, and the performance card 44E is a performance card of a game preceding the last game. In the example of FIG. 9, the log-in user is a fielder. Thus, performance cards 44A and 44E indicate the at-bat result of each at-bat.

A performance card 44B is a performance card indicating performance of a game in which a player (pitcher) followed by the log-in user plays, and a performance card 44C is a performance card indicating performance of a game in which a player (fielder) followed by the log-in user plays. The performance card 44B indicates the opponent team as the target player is a pitcher, and the performance card 44C indicates the at-bat result of each at-bat as the target player is a fielder.

A performance card 44D is an example of a performance card to which a meeting document or the like is attached, and a performance card 44F is an example of a performance card to which a message is assigned. Hereinafter, when collectively referred to without distinction, the performance cards 44A, 44B, 44C, 44D, 44E, and 44F are merely represented by "performance card 44".

When any performance card 44 including a thumbnail image is selected from the time line display area 43, the display control unit 12 delivers the pitching meta data used for generating the selected performance card 44 to the acquisition unit 11 as the retrieval condition. When a performance card 44 not including a thumbnail image is selected, the display control unit 12 performs a processing corresponding to the performance card 44 such as opening of a document attached to the performance card 44.

Figure 10:
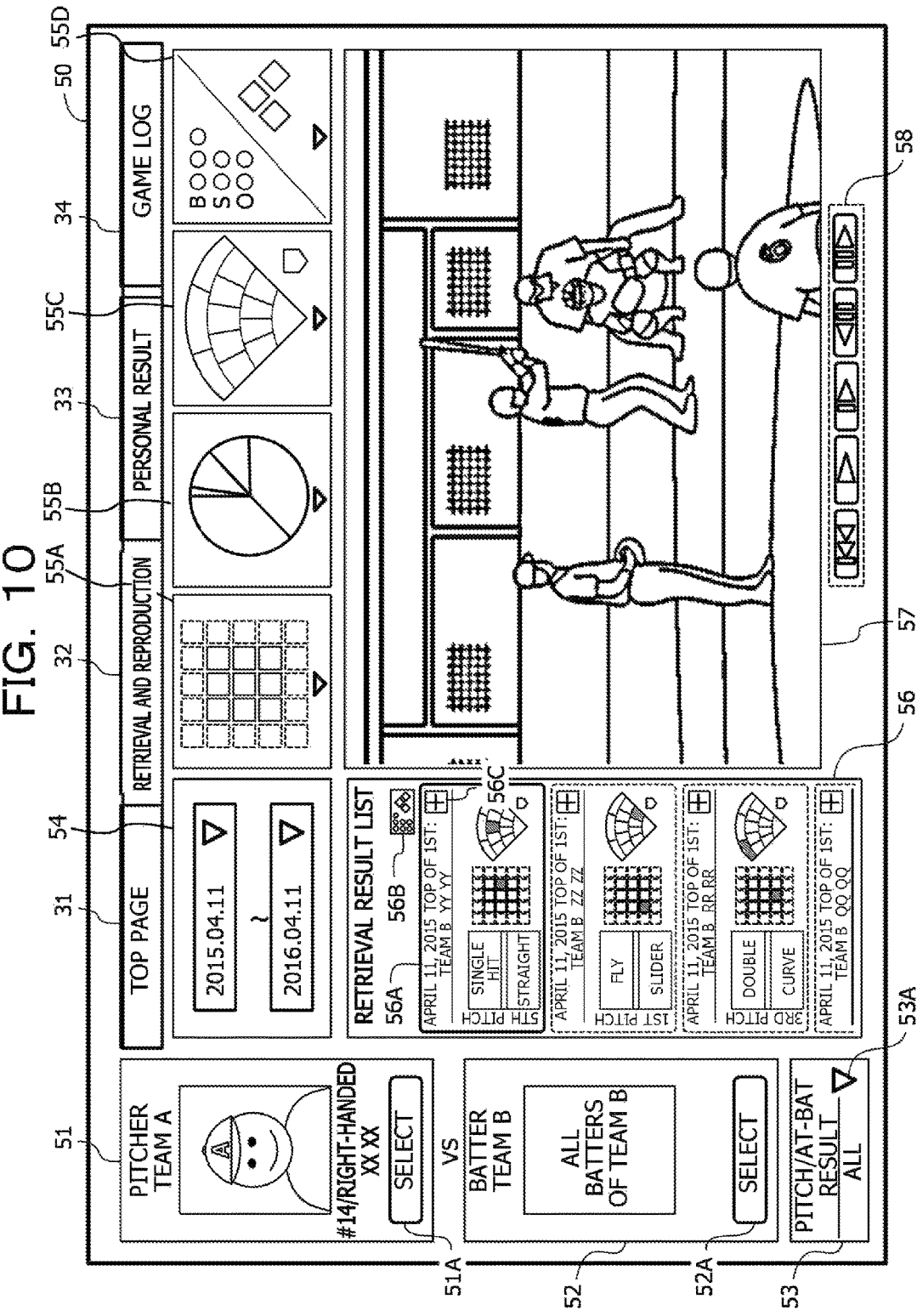
FIG. 10 illustrates an example of a retrieval and reproduction screen.

When the retrieval and reproduction tab 32 is selected, the display control unit 12 displays, for example, a retrieval and reproduction screen 50 such as illustrated in FIG. 10 on the display device 84. The retrieval and reproduction screen 50 includes a top page tab 31, a retrieval and reproduction tab 32, a personal result tab 33, and a game log tab 34. The retrieval and reproduction screen 50 is a screen in a state where the retrieval and reproduction tab 32 is selected. The retrieval and reproduction screen 50 includes a target player entry area 51, an opponent player entry area 52, a pitch/at-bat result entry area 53, a game date entry area 54, narrowing condition areas 55A, 55B, 55C, 55D, and a retrieval result list area 56. The retrieval and reproduction screen 50 further includes a video image reproduction area 57 and a display control button group 58. Each of the target player entry area 51, opponent player entry area 52, pitch/at-bat result entry area 53, game date entry area 54, and narrowing condition areas 55A, 55B, 55C, 55D is an area for entering a retrieval condition of the video image.

When a select button 51A included in the target player entry area 51 is selected, the display control unit 12 provides a display for entering the target player. For example, the display control unit 12 acquires player information in the player information table 23 of the distribution server 20, generates a list of players for each of teams, and displays players in a selectable state. The display control unit 12 displays information of the selected player in the target player entry area 51.

When a select button 52A included in the opponent player entry area 52 is selected, the display control unit 12 provides a display for entering the opponent player as in the case of entering the target player. The display control unit 12 displays information of the selected player in the opponent player entry area 52. The entering method for the opponent player also includes entering all players and entering all players belonging to a specific team. When the opponent player is a pitcher, the entering method also includes entering the left-handed or right-handed player, and when the target player is a fielder, the entering method also includes entering the right-handed or left-handed player as the opponent player.

When a select button 53A included in the pitch/at-bat result entry area 53 is selected, the display control unit 12 provides a display for entering the pitch result and at-bat result. For example, the pitch result is displayed in such a manner that all pitch results, strikes, or balls are selectable. The strike may be more specific information from which called strike, swing and miss, or foul is selectable. The at-bat result may be displayed in such a manner that all at-bat results, hits, outs, or others are selectable. The hit may be displayed in such a manner that the single, double, triple, or home run is selectable. The out may be displayed in such a manner that the single out, double play, or strikeout is selectable. Others may be displayed in such a manner that the four balls, hit by pitch, sacrifice fly, or the like is selectable. Further, the hit and out may be displayed in such a manner that the more specific at-bat result such as hit to a center and fly to a right field is selectable. The display control unit 12 displays the selected pitch result or at-bat result in the pitch/at-bat result entry area 53.

Display for selecting the above target player, opponent player, and pitch/at-bat result is provided, for example, by displaying a pull-down menu or another window. An entry by direct input into the text box or the like also may be accepted.

When the target player, opponent player, and pitch/at-bat result are entered, the display control unit 12 delivers the target player, opponent player, and pitch/at-bat result entered in their respective entry areas to the acquisition unit 11 as retrieval conditions. Thus, the display control unit 12 acquires the video image file 21 and pitching meta data distributed from the distribution server 20 via the acquisition unit 11. When any performance card 44 or a recent at-bat is selected on the above top page screen 40, the display control unit 12 displays a retrieval condition in each entry area based on the pitching meta data corresponding to the selected performance card 44 or recent at-bat.

Based on the acquired pitching meta data, the display control unit 12 displays a list of retrieval results in the retrieval result list area 56 in a state where each of the retrieval results is selectable. In the example of FIG. 10, the display control unit 12 displays each retrieval result 56A within one frame, wherein at-bats including the pitch scene matching the retrieval condition are displayed as one retrieval result 56A. In the example of FIG. 10, a frame indicating one retrieval result contains information indicating the game date, inning, opponent team, opponent player, pitch result or at-bat result, pitch type, pitching course, hitting direction, and the ordinary number of pitch in the at-bat. Unless the retrieval condition selecting the pitched ball is not entered, the retrieval result 56A is displayed based on pitching meta data for a pitch scene indicating a last pitched ball in the at-bat. In the case where the retrieval condition selecting the pitched ball is entered, the retrieval result 56A is displayed based on pitching meta data for a pitch scene matching the retrieval condition. The retrieval condition selecting the pitched ball is entered with the pitch result entered in the pitch/at-bat result entry area 53 and with any of narrowing conditions described below. The pitching course and hitting direction are represented by a symbol image indicating the pitching course and a symbol image indicating the hitting direction respectively.

The display control unit 12 displays a selected retrieval result 56A out of retrieval results 56A included in the retrieval result list area 56, in a display mode different from other retrieval results 56A. In the example of FIG. 10, the frame line of the selected retrieval result 56A is depicted with a heavy line, and unselected frame lines of retrieval results 56A are depicted with a broken line.

Figure 11:
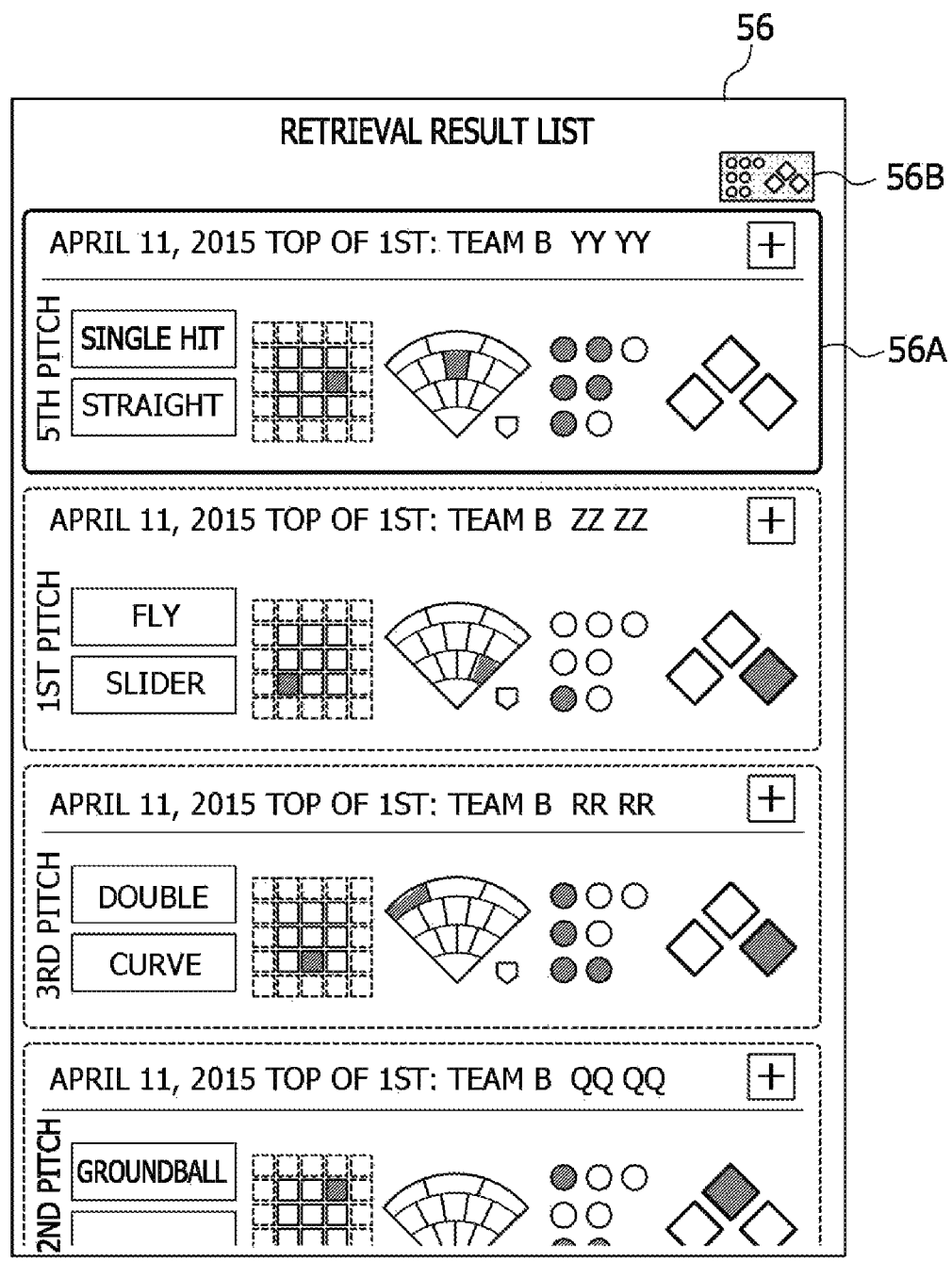
FIG. 11 illustrates an example of a retrieval result list area when a situation display button is selected.

When a situation display button 56B included in the retrieval result list area 56 is selected, the display control unit 12, for example, develops display of the retrieval result list area 56 and additionally displays the situation of the count and runner within the frame of each retrieval result 56A as illustrated in FIG. 11. In the example of FIG. 11, the situation of the count and runner is represented by a symbol image indicating the count, and a symbol image indicating the situation of the runner respectively.

Figure 12:
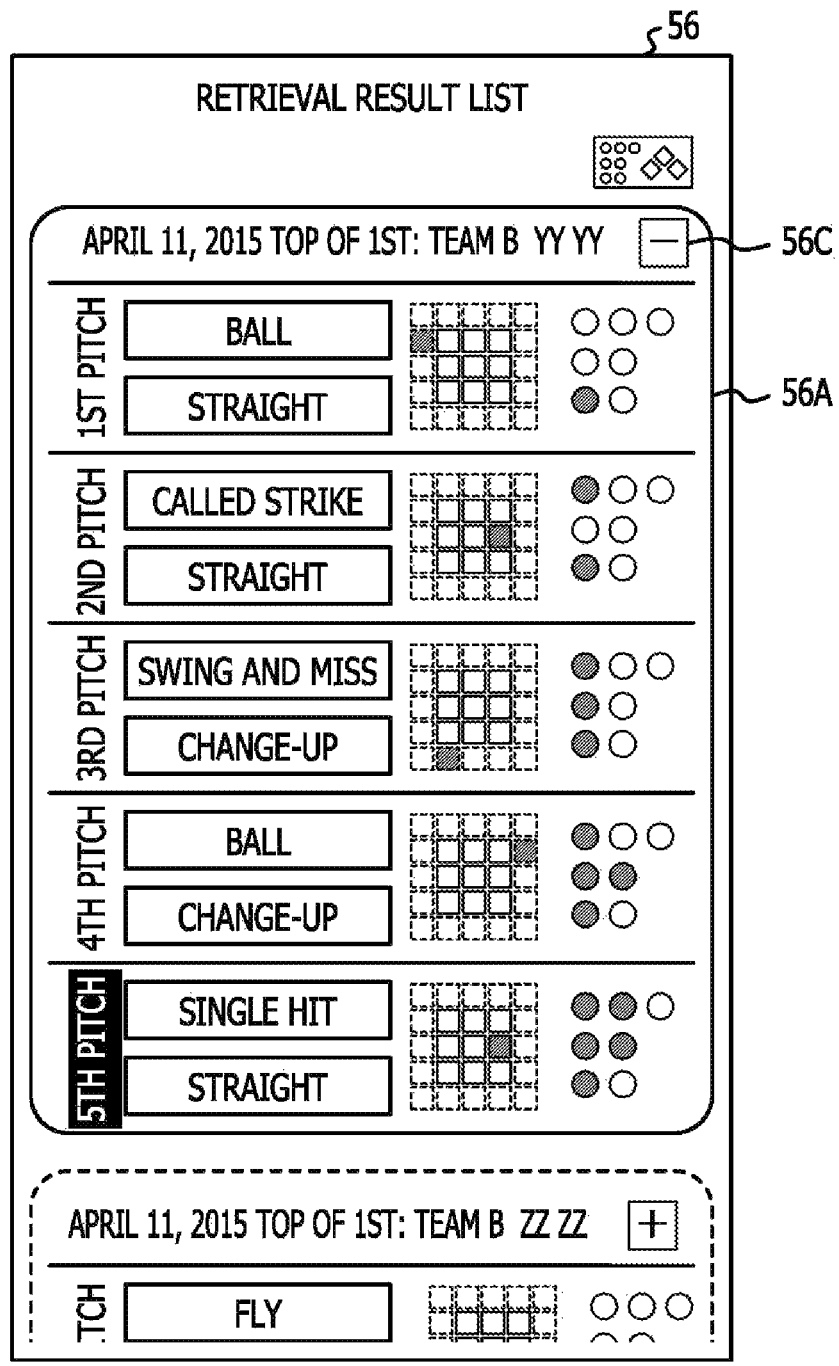
FIG. 12 illustrates an example of a retrieval result list area when an all-pitches display button is selected.

When an all-pitches display button 56C included in each retrieval result 56A is selected, the display control unit 12, for example, develops display of a retrieval result 56A matching the selected all-pitches display button 56C as illustrated in FIG. 12. Then, the display control unit 12 displays information of each pitch scene included in the at-bat indicated by the retrieval result 56A. The display control unit 12 displays information of the pitch scene displayed before developing the retrieval result 56A, in a display mode different from other pitch scenes. In the example of FIG. 12, the display control unit 12 makes reverse display in a portion indicating for which pitch in the at-bat the pitch scene is displayed before developing the retrieval result 56A.

Based on the pitching meta data corresponding to the retrieval result 56A selected in the retrieval result list area 56, the display control unit 12 identifies the selected pitch scene out of the acquired video image file 21 and reproduces in the video image reproduction area 57. More specifically, the display control unit 12 identifies the video image file 21 by "file name" of the pitching meta data corresponding to the selected retrieval result 56A, and reproduces the identified video image file 21 from a frame indicated by the frame time in "pitch tag" of the pitching meta data. When any retrieval result 56A is not selected from the retrieval result list area 56 by the log-in user, reproduction may be started automatically from a video image corresponding to a predetermined retrieval result 56A, for example, such as a leading retrieval result 56A.

When any button included in the display control button group 58 is selected, the display control unit 12 performs display control matching the selected button for the video image reproduced in the video image reproduction area 57. The display control button group 58, for example, includes a reproduction/pause button, a fast reversing button, a fast-forward button, a frame feed button, a frame reversing button, and so on. When the reproduction/pause button is selected, the display control unit 12 performs pause control of the video image being reproduced or performs reproduction control of the video image being paused. When the fast reversing button is selected, the display control unit 12 performs fast reversing control of the video image being reproduced, and when the fast-forward button is selected, the display control unit 12 performs fast-forward control of the video image being reproduced. When the frame reversing button is selected, the display control unit 12 performs frame reversing control of the video image being reproduced, and when the frame feed button is selected, the display control unit 12 performs frame feed control of the video image being reproduced.

When the game date is entered and any narrowing condition is entered, the display control unit 12 narrows retrieval results 56A displayed in the retrieval result list area 56 and updates display of the retrieval result list area 56.

More specifically, when the game date is entered in the game date entry area 54, the display control unit 12 narrows retrieval results 56A displayed in the retrieval result list area 56 into a retrieval result 56A matching the entered game date.

The narrowing condition is entered in each of narrowing condition areas 55A, 55B, 55C, and 55D. The narrowing condition area 55A is selected when the pitching course is entered as the narrowing condition. The narrowing condition area 55B is selected when the pitch type is selected as the narrowing condition. The narrowing condition area 55C is selected when the hitting direction is selected as the narrowing condition. The narrowing condition area 55D is selected when the situation of the count and runner is entered as the narrowing condition.

Figure 13:
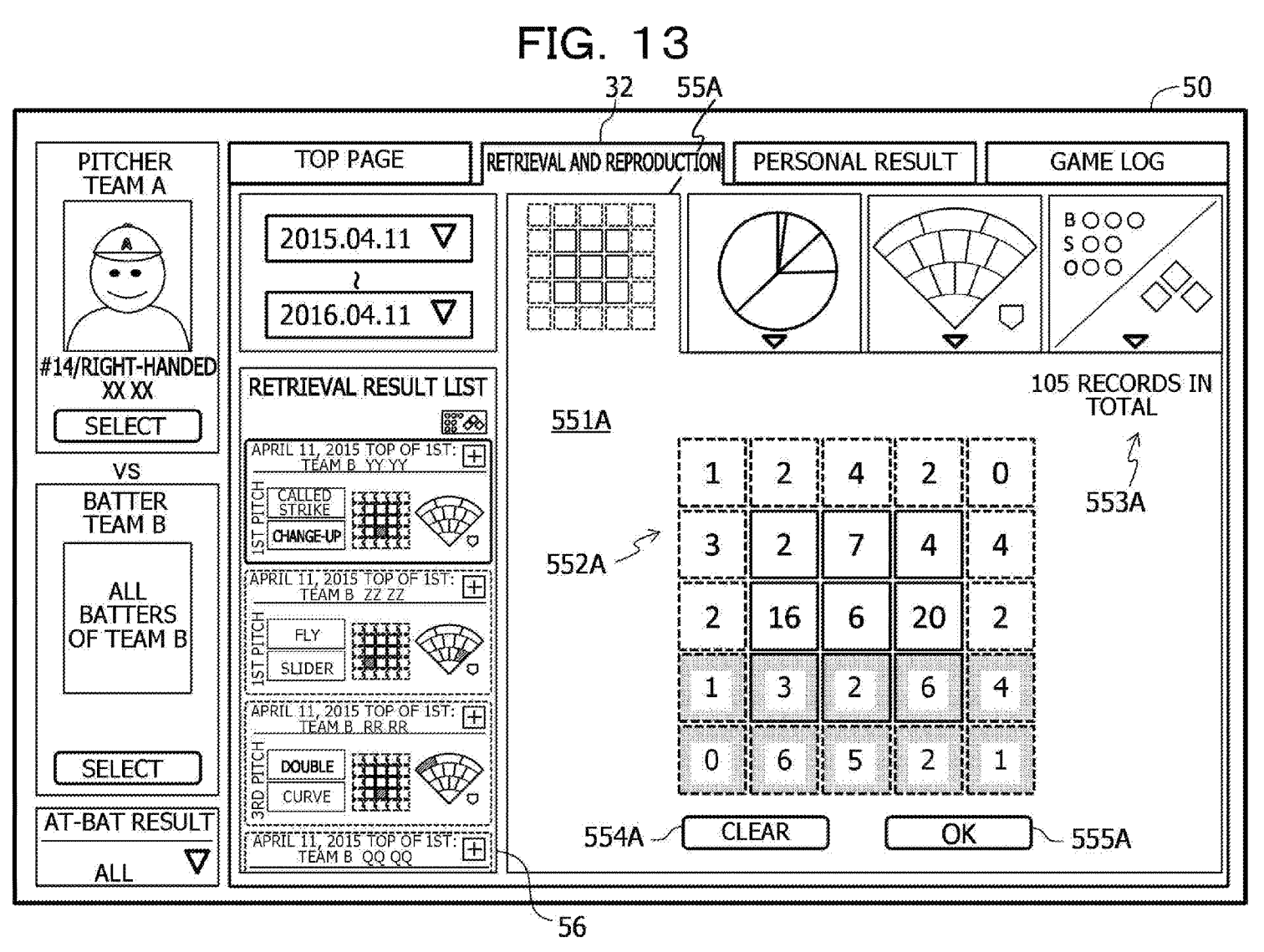

When the narrowing condition area 55A is selected, the display control unit 12 develops and displays, for example, a narrowing condition entry area 551A for entering the pitching course on the video image reproduction area 57 as illustrated in FIG. 13. The narrowing condition entry area 551A includes a specifying component 552A of a symbol image indicating the pitching course for receiving the pitching course to be entered as the narrowing condition. The display control unit 12 displays the block of the selected pitching course in a display mode different from blocks of pitching courses not selected. In the example of FIG. 13, the selected block is indicated by halftone dots.

The narrowing condition entry area 551A includes a total pitch count display 553A included in the retrieval result 56A displayed in the current retrieval result list area 56. Each block of the specifying component 552A indicates the number of pitches whose pitching course matches the pitching course indicated by the block out of all pitches included in all retrieval results 56A indicated in the current retrieval result list area 56. The narrowing condition entry area 551A includes a clear button 554A for clearing the select state of the specifying component 552A and an OK button 555A for determining the select state of the specifying component 552A.

When the OK button 555A is selected, the display control unit 12 narrows retrieval results 56A indicated in the retrieval result list area 56 into a retrieval result 56A whose pitching course matches the pitching course entered in the specifying component 552A, and updates display of the retrieval result list area 56. Then, when any retrieval result 56A is selected from the retrieval result list area 56, the display control unit 12 clears display of the narrowing condition entry area 551A, displays the video image reproduction area 57, and reproduces a video image indicated by the selected retrieval result 56A. The display control unit 12 updates the display of the symbol image representing the pitching course in the narrowing condition area 55A to a display reflecting the condition entered in the specifying component 552A.

Figure 14:
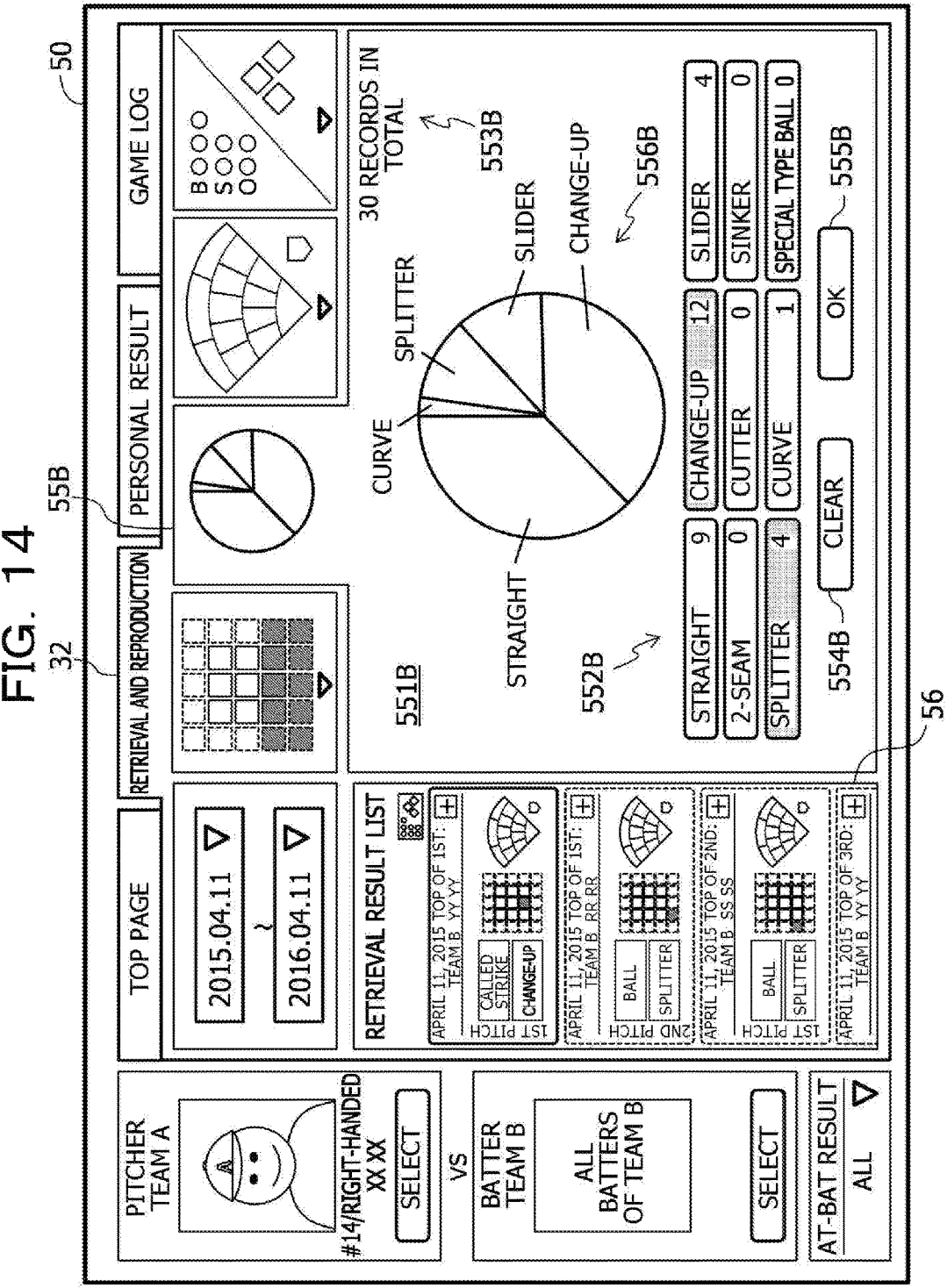
FIG. 14 illustrates an example of a retrieval and reproduction screen where a narrowing condition entry area for entering the pitch type is displayed.

When the narrowing condition area 55B is selected, the display control unit 12 develops and displays, for example, a narrowing condition entry area 551B for entering the pitch type on the video image reproduction area 57 as illustrated in FIG. 14. The narrowing condition entry area 551B includes a specifying component 552B for receiving the pitch type to be entered as the narrowing condition. Similarly with the narrowing condition entry area 551A, the narrowing condition entry area 551B includes the total pitch count display 553B and indicates the number of pitches of each pitch type of the specifying component 552B. Further, the narrowing condition entry area 551B also includes a display 556B in which the number of pitches of each pitch type is graphed. The narrowing condition entry area 551B further includes a clear button 554B and an OK button 555B.

Display control upon selection of the specifying component 552B, the clear button 554B, and the OK button 555B is the same as in the narrowing condition entry area 551A. Also, updating of the retrieval result list area 56 and display control after selection of the retrieval result 56A from the updated retrieval result list area 56 are the same as in the narrowing condition area 55A.

Figure 15:
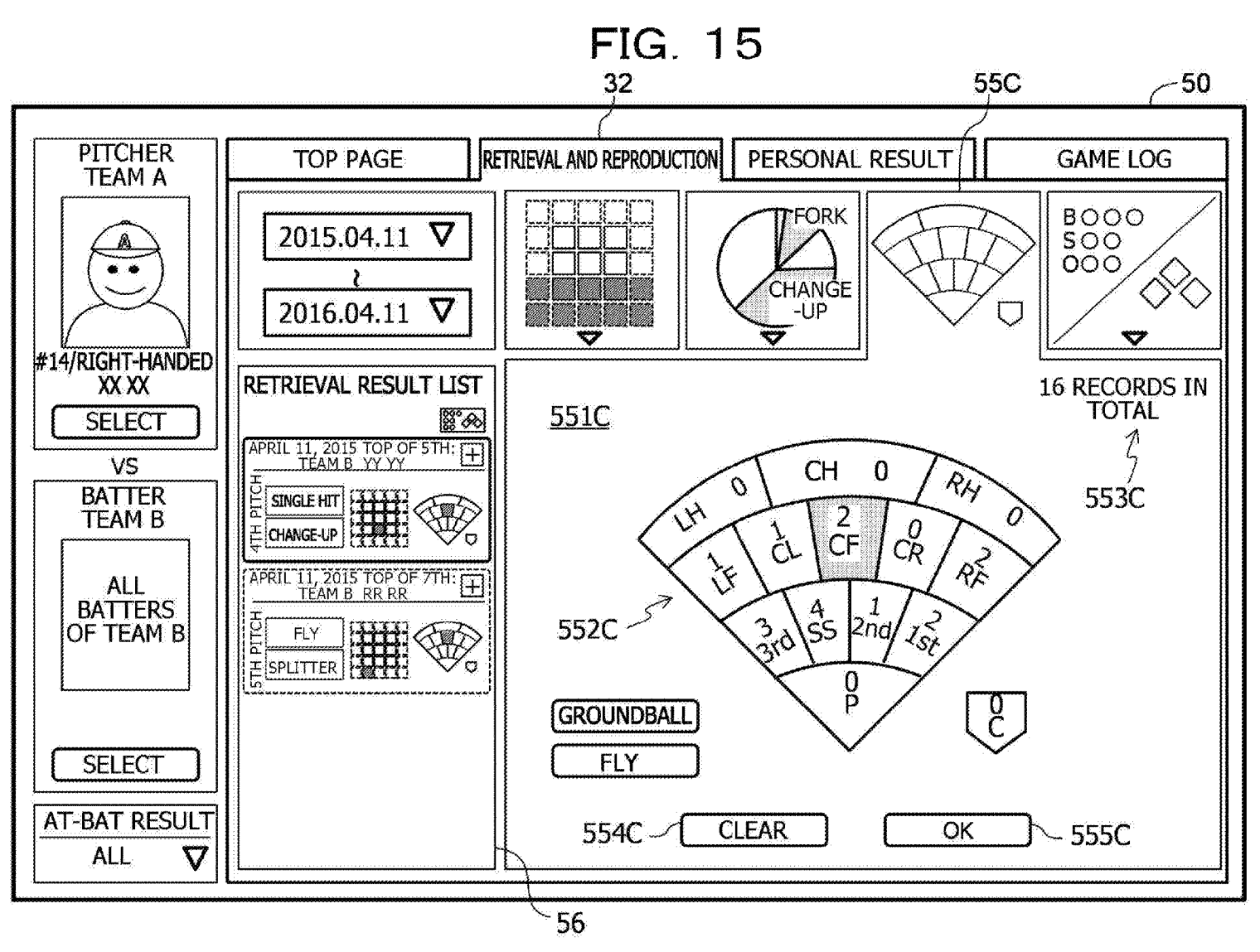

When the narrowing condition area 55C is selected, the display control unit 12 develops and displays, for example, a narrowing condition entry area 551C for entering the hitting direction on the video image reproduction area 57 as illustrated in FIG. 15. The narrowing condition entry area 551C includes a specifying component 552C of a symbol image representing the hitting direction for receiving the hitting direction to be entered as the narrowing condition. FIG. 15 illustrates an example of the specifying component 552C in which how the hit ball rises (groundball or fly) may be entered as a specifying condition along with the hitting direction. Similarly with the narrowing condition entry area 551A, the narrowing condition entry area 551C includes a total pitch count display 553C and also indicates the number of pitches in each hitting direction of the specifying component 552C. The narrowing condition entry area 551C includes a clear button 554C and an OK button 555C.

Display control upon selection of the specifying component 552C, clear button 554C, and OK button 555C is the same as in the narrowing condition entry area 551A. Also, updating of the retrieval result list area 56 and display control after selection of the retrieval result 56A from the updated retrieval result list area 56 are the same as in the narrowing condition area 55A. A narrowing condition area 55C of FIG. 16 described below indicates an example where the hitting direction is not entered as the narrowing condition in FIG. 15.

Figure 16:
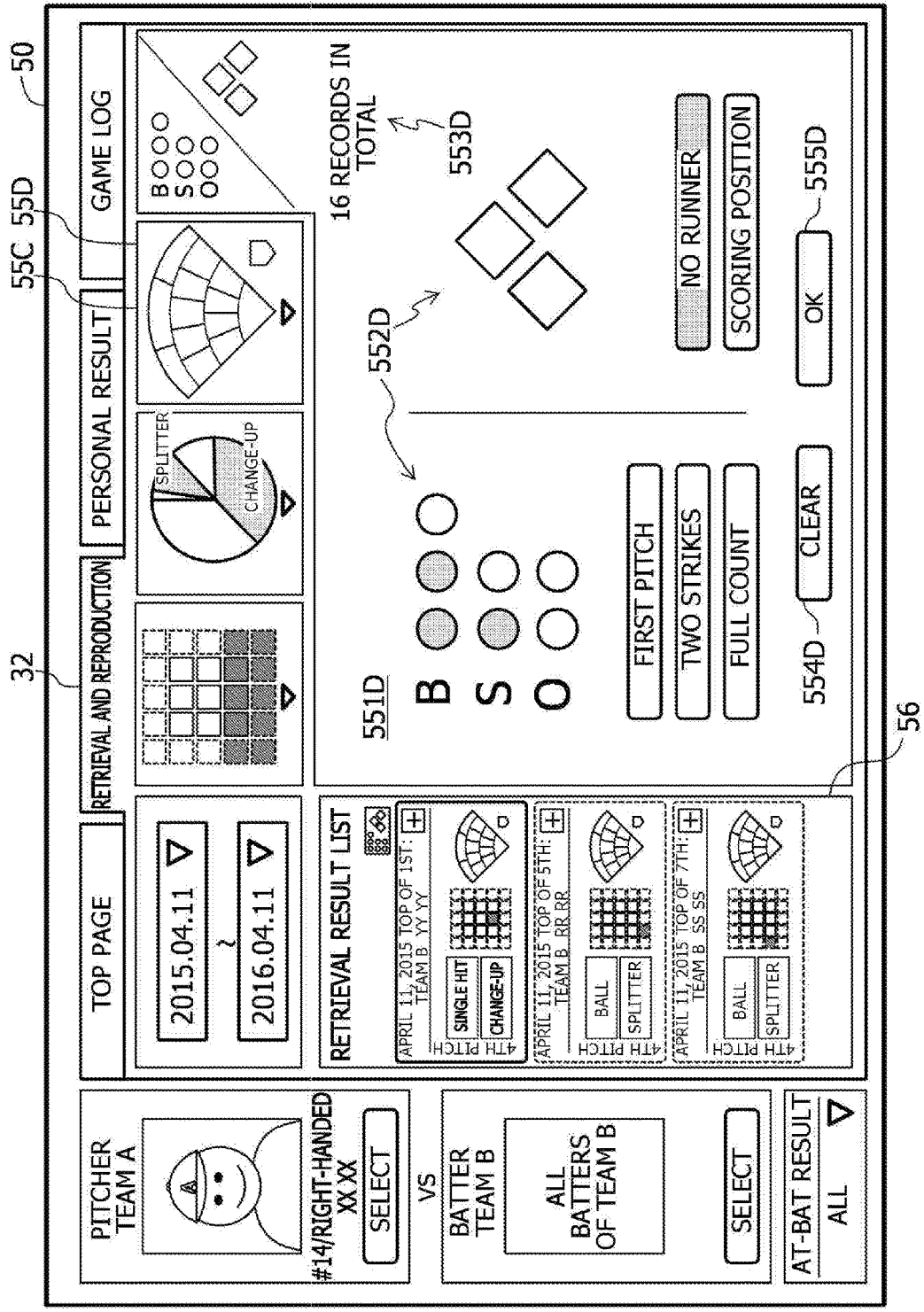
FIG. 16 illustrates an example of a retrieval and reproduction screen where a narrowing condition entry area for entering the count and runner state is displayed.

When the narrowing condition area 55D is selected, the display control unit 12 develops and displays, for example, a narrowing condition entry area 551D for entering the situation of the count and runner on the video image reproduction area 57 as illustrated in FIG. 16. The narrowing condition entry area 551D includes a specifying component 552D of a symbol image representing the situation of the count and runner for receiving the situation of the count and runner to be entered as the narrowing condition.

FIG. 16 illustrates an example of the specifying component 552D including a button for entering a situation which is difficult to enter with the symbol image only. For example, a button of "no runner" is used to enter a situation where there is no runner, for distinguishing from the case where the runner's situation is not entered. The same also applies to a "first pitch" button. "Scoring position" makes it possible to enter multiple situations which are difficult to enter with the symbol image, such as a situation where a runner(s) is on the second base, on second and third bases, or on the third base. The same also applies to "two strikes" and "full count" buttons.

Similarly with the narrowing condition entry area 551A, the narrowing condition entry area 551D includes the total pitch count display 553D. The narrowing condition entry area 551D includes a clear button 554D and an OK button 555D.

Display control upon selection of the specifying component 552D, clear button 554D, and OK button 555D is the same as in the narrowing condition entry area 551A. Also, updating of the retrieval result list area 56 and display control after selection of the retrieval result 56A from the updated retrieval result list area 56 are the same as in the narrowing condition area 55A.

Hereinafter, when collectively referred to without distinction, narrowing condition areas 55A, 55B, 55C, and 55D are merely represented by "narrowing condition area 55". In the same manner, when collectively referred to without distinction, the narrowing condition entry area, specifying component, clear button, and OK button are represented respectively by a reference numeral excluding the sign A, B, C, or D.

Figure 17:
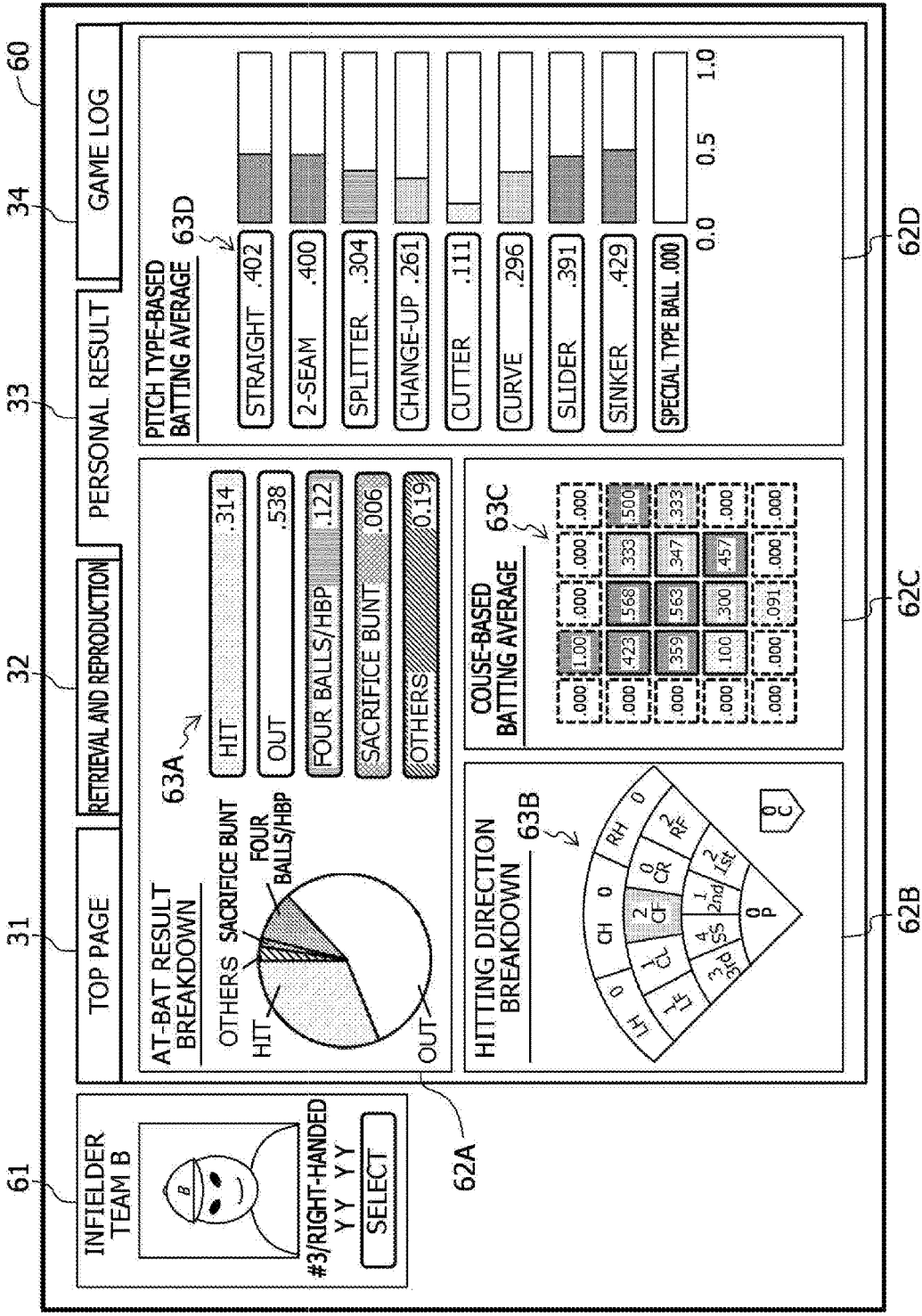
FIG. 17 illustrates an example of a personal result screen when the target player is a fielder.

When the personal result tab 33 is selected, the display control unit 12 displays, for example, a personal result screen 60 such as illustrated in FIGS. 17 and 18 on the display device 84. The personal result screen 60 includes a top page tab 31, a retrieval and reproduction tab 32, a personal result tab 33, and a game log tab 34. The personal result screen 60 is a screen in a state where the personal result tab 33 is selected. The personal result screen 60 includes a target player entry area 61 and result display areas 62A to 62H. The target player entry area 61 is the same as the target player entry area 51 of the retrieval and reproduction screen 50. Hereinafter, when collectively referred to without distinction, result display areas 62A to 62H are merely represented by "result display area 62".

When the target player is entered in the target player entry area 61, the display control unit 12 transmits the player ID of the entered player to the distribution server 20 and acquires result information of the player from the result information table 26 of the distribution server 20. Based on the acquired result information, the display control unit 12 displays the result in the format of a graph or a symbol image in the result display area 62.

FIG. 17 illustrates an example of the personal result screen 60 when the target player is a fielder. The result display area 62A displays a result on "at-bat result breakdown" in a graph format and displays a specifying component 63A in which each at-bat result as a result item may be selected. The result display area 62B displays a result on "hitting direction breakdown" in association with each block of the symbol image indicating the hitting direction. The symbol image indicating the hitting direction also functions as the specifying component 63B in which a block indicating each hitting direction as the result item may be selected. The result display area 62C displays a result on "course-based batting average" in association with each block of the symbol image indicating the pitching course. The symbol image indicating the hitting direction also functions as a specifying component 63C in which a block indicating each pitch as the result item may be selected. The result display area 62D displays a result on "pitch type-based batting average" in a graph format and displays a specifying component 63D in which each pitch type as the result item may be selected.

FIG. 18 illustrates an example of the personal result screen 60 when the target player is a pitcher. A result display area 62E displays a result on "at-bat-based pitch result breakdown" in a graph format and displays a specifying component 63E in which each at-bat result as the result item may be selected. A result display area 62F displays a result on "situation based batted average" as a selectable button in association with a symbol image representing each situation. Each button also functions as the specifying component 63B in which each situation as the result item may be selected. A result display area 62G displays a result on "course-based batted average" in association with each block of the symbol image indicating the pitching course. The symbol image indicating the pitching course also functions as a specifying component 63G in which a block indicating each pitching course as the result item may be selected. A result display area 62H displays a result on "pitch type-based batted average" in a graph format and displays a specifying component 63H in which each pitch type as the result item may be selected.

The display control unit 12 may display the graph and symbol image of each result item indicated on each result display area 62 in a different color depending on, for example, whether the result in the result item is not lower than or not higher than a predetermined value. Hereinafter, when collectively referred to without distinction, specifying components 63A to 63H are merely represented by "specifying component 63".

When any result item is selected by operating any specifying component 63, the display control unit 12 delivers the at-bat result, hitting direction, pitching course, pitch type, or situation of the count and runner corresponding to the selected result item to the acquisition unit 11 as the retrieval condition. Thus, the display control unit 12 acquires the video image file 21 and pitching meta data distributed from the distribution server 20 via the acquisition unit 11. The display control unit 12 switches the screen to the retrieval and reproduction screen 50, displays the retrieval condition specified by the specifying component 63 in an entry area of the retrieval condition, and displays the retrieval result list in the retrieval result list area 56 based on the acquired pitching meta data. For example, assume that a 17th block (a second block from the left on the fourth row) is selected from the specifying component 63C included in the result display area 62C of the course-based batting average in the personal result screen 60 illustrated in FIG. 17. In this case, the display control unit 12 displays, in the target player entry area 51 of the retrieval and reproduction screen 50, information of the player entered in the target player entry area 61 of the personal result screen 60, and changes display of the narrowing condition area 55A into a state where the 17th block is entered. Also, all players are entered in the opponent player entry area 52, all are entered in the pitch/at-bat result entry area 53, nothing is entered in the game date entry area 54, and nothing is entered in the narrowing condition areas 55B, 55C, and 55D.

When the game log tab 34 is selected, the display control unit 12 displays, for example, a game log screen 70 such as illustrated in FIG. 19 on the display device 84. The game log screen 70 includes a top page tab 31, a retrieval and reproduction tab 32, a personal result tab 33, and a game log tab 34. The game log screen 70 is a screen in a state where the game log tab 34 is selected. The game log screen 70 includes a game date entry area 71, a select button 72, a game overview display area 73, and a box score display area 74. The game date entry area 71 may be a text box in which the date may be entered directly into a text box, or may be a pull-down menu in which the date may be selected or in a format in which a calendar is displayed in a separate window. In the case where the calendar is displayed, the opponent team may be indicated in each date field.

When the game date is entered in the game date entry area 71, the display control unit 12 transmits the entered game date to the distribution server 20 via the acquisition unit 11. The distribution server 20 identifies the game based on the entered game date and the team to which the log-in user belongs, extracts game information of the game from the game information table 27, and extracts pitching meta data of the game from the pitching meta data table 25. Then, the distribution server 20 transmits the extracted game information and pitching meta data as well as the video image file 21 of the game to the display controller 10. The display control unit 12 acquires the game information, pitching meta data, and video image file 21 via the acquisition unit.

The display control unit 12 displays the content of the acquired game information in the game overview display area 73 in a predetermine format. In the example of FIG. 19, the inning-based score is indicated in a score board format. Based on the acquired pitching meta data, the display control unit 12 generates a box score in which the inning based result of each player arranged in the batting order is represented in a matrix format, and displays in the box score display area 74 in a state where each frame (each at-bat) is selectable.

When any frame (at-bat) is selected from the box score, the display control unit 12 switches the screen to the retrieval and reproduction screen 50. Based on the pitching meta data of the selected at-bat, the display control unit 12 displays the retrieval condition in each entry area, and displays information of the selected at-bat in the retrieval result list area 56 as the retrieval result 56A and reproduces the video image of the at-bat in the video image reproduction area 57.

Figure 20:
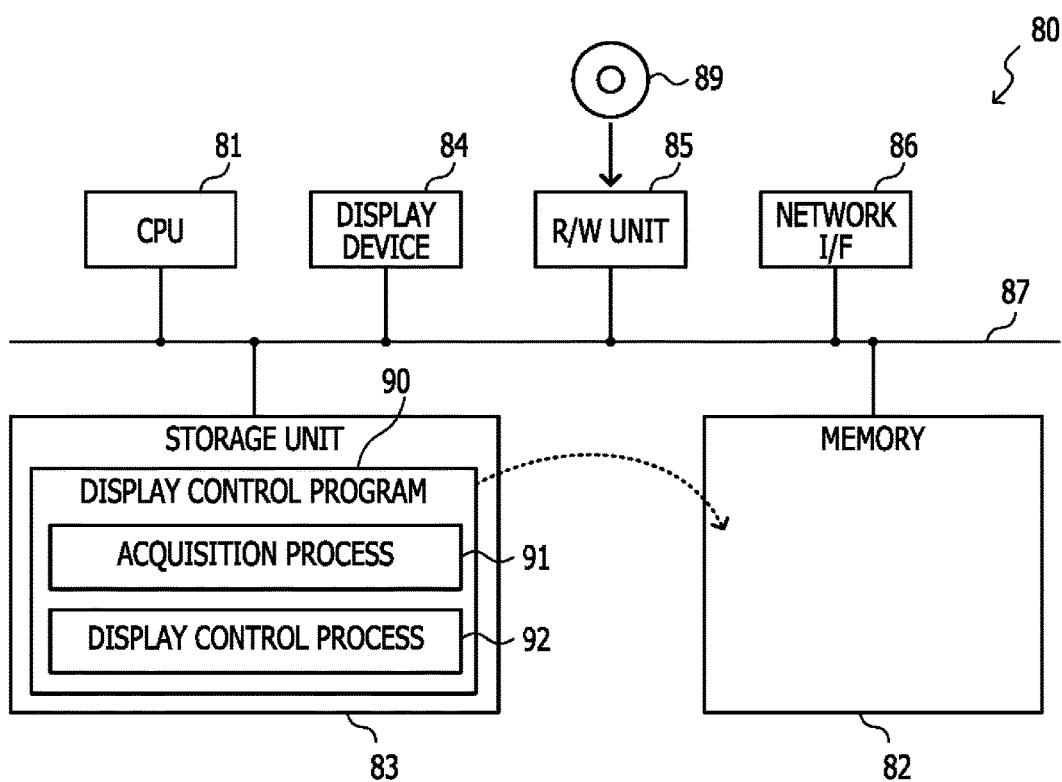
FIG. 20 is a block diagram illustrating a schematic configuration of a computer that functions as the display controller according to the embodiment.

The display controller 10 may be implemented, for example, by a computer 80 illustrated in FIG. 20. The computer 80 comprises a CPU 81, a memory 82 as a temporary storage area, and a nonvolatile storage unit 83. Also, the computer 80 comprises a display devise 84, a read/write (R/W) unit 85 configured to control reading and writing of data into a recording medium 89, and a network interface (I/F) 86 connected to the network such as the internet. The CPU 81, memory 82, storage unit 83, display device 84, R/W unit 85, and the network I/F 86 are coupled to each other via a bus 87.

The storage unit 83 may be implemented by a hard disk drive (HDD), a solid state drive (SSD), a flash memory, or the like. The storage unit 83 as a recording medium stores a display control program 90 configured to cause the computer 80 to function as the display controller 10. The display control program 90 includes an acquisition process 91 and a display control process 92.

The CPU 81 is configured to read out the display control program 90 from the storage unit 83, develop in the memory 82, and run processes of the display control program 90 sequentially. The CPU 81 operates as the acquisition unit 11 illustrated in FIG. 1 by running the acquisition process 91. The CPU 81 operates as the display control unit 12 illustrated in FIG. 1 by running the display control process 92. Thus, the computer 80, which has run the display control program 90, functions as the display controller 10.

Functions implemented by the display control program 90 also may be implemented, for example, by a semiconductor integrated circuit, more particularly, by an application specific integrated circuit (ASIC) or the like.

Figure 21:
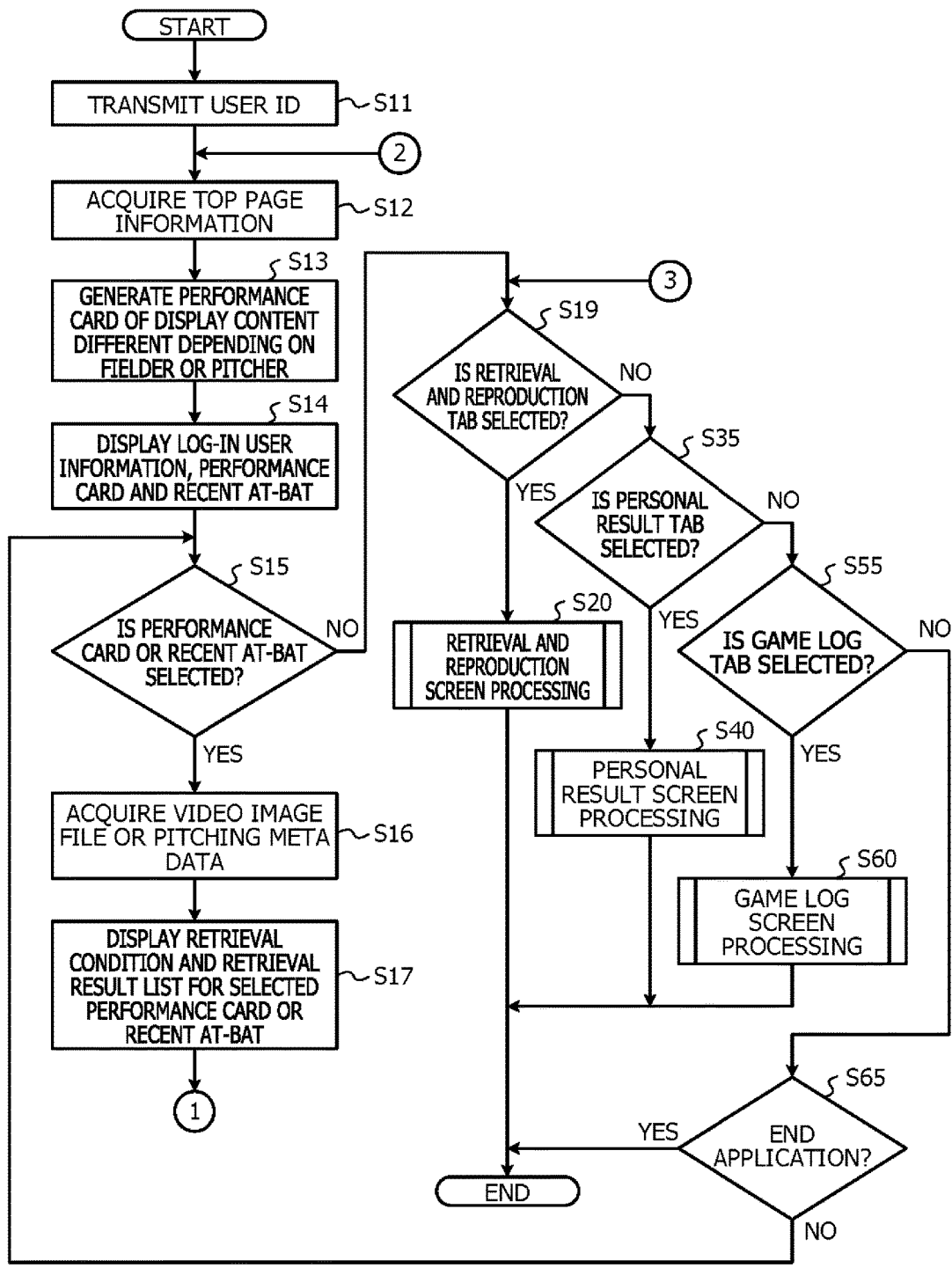
FIG. 21 is a flowchart illustrating an example of a display control processing in the embodiment.

Next, operation of the display controller 10 according to the embodiment is described. When the application provided by the display controller 10 is activated by the user's log-in with entry of the user ID, a display control processing illustrated in FIG. 21 is performed in the display controller 10.

In the step S11, the acquisition unit 11 receives the user ID of the entered log-in user, transmits the user ID to the distribution server 20, and requests top page information including player information, thumbnail image, and pitching meta data relative to the log-in user.

Next, in the step S12, the acquisition unit 11 acquires the top page information transmitted from the distribution server 20 in response to the request. The acquisition unit 11 delivers the acquired top page information to the display control unit 12.

Next, in the step S13, the display control unit 12 generates the performance card 44 based on the thumbnail image and pitching meta data delivered from the acquisition unit 11. In this step, in the case where the log-in user is a fielder, the display control unit 12 generates a performance card 44 including the at-bat result of each at-bat in the concerned game. In the case where the log-in user is a pitcher, the display control unit 12 generates a performance card 44 including the opponent team in the concerned game. The display control unit 12 also generates other performance cards 44 based on the top page information such as a performance card 44 accompanied by a message and a performance card accompanied by an attached file.

Next, in the step S14, the display control unit 12 displays, for example, a top page screen 40 such as illustrated in FIG. 9. More specifically, the display control unit 12 displays, based on the player information of the log-in user delivered from the acquisition unit 11, player's name, team, position, uniform number, throwing method or hitting method, and picture of the log-in user, in the log-in user display area 41. The display control unit 12 also displays, based on pitching meta data of the pitch scene for last several games of the log-in user delivered from the acquisition unit 11, the at-bat result for a predetermined number of at-bats in the descending order from a latest at-bat, in the recent at-bat display area 42. Further, the display control unit 12 displays performance cards 44 generated in the above step S13 in the time line display area 43 in the descending order of the date of respective performance cards 44.

Next, in the step S15, the display control unit 12 determines whether any performance card 44 including the thumbnail image is selected or any at-bat is selected from the recent at-bat display area 42 on the top page screen 40. When any performance card 44 or a recent at-bat is selected, processing proceeds to the step S16, and when neither the performance card 44 nor the recent at-bat is selected, processing proceeds to the step S19. In this step, when a performance card 44 not including the thumbnail image is selected, the display control unit 12 performs display control matching the selected performance card 44.

In the step S16, the display control unit 12 delivers the pitching meta data used for generating the selected performance card 44 or pitching meta data used for displaying the selected recent at-bat information to the acquisition unit 11 as the retrieval condition. Thus, the display control unit 12 acquires the video image file 21 and pitching meta data matching the retrieval condition from the distribution server 20 via the acquisition unit 11.

Next, in the step S17, the display control unit 12 displays a retrieval condition in each entry area based on pitching meta data corresponding to the selected performance card 44 or recent at-bat. Based on the acquired pitching meta data, the display control unit 12 displays a list of retrieval results 56A indicating an at-bat corresponding to the selected performance card 44 or a list of retrieval results 56A indicating an at-bat selected from the recent at-bat display area 42 in the retrieval result list area 56. Then, processing proceeds to the step S24 of the retrieval and reproduction screen processing described below, and the display control unit 12 starts reproduction of a video image indicating the pitch scene included in an at-bat corresponding to the selected performance card 44 or the selected recent at-bat in the video image reproduction area 57.

Meanwhile, in the step S19, the display control unit 12 determines whether the retrieval and reproduction tab 32 is selected on the top page screen 40. When the retrieval and reproduction tab 32 is selected, processing proceeds to the step S20, retrieval and reproduction screen processing described below is performed, and the display control processing ends. When the retrieval and reproduction tab 32 is not selected, processing proceeds to the step S35.

In the step S35, the display control unit 12 determines whether the personal result tab 33 is selected on the top page screen 40. When the personal result tab 33 is selected, processing proceeds to the step S40, personal result screen processing described below is performed, and the display control processing ends. When the personal result tab 33 is not selected, processing proceeds to the step S55.

In the step S55, the display control unit 12 determines whether the game log tab 34 is selected on the top page screen 40. When the game log tab 34 is selected, processing proceeds to the step S60, game log screen processing described below is performed, and the display control processing ends. When the game log tab 34 is not selected, processing proceeds to the step S65.

In the step S65, the display control unit 12 determines whether a command instructing to end the application has been entered, and then determines whether to end the application. When not ending the application, processing returns to the step S15, and when ending the application, the display control processing ends.

Figure 22:
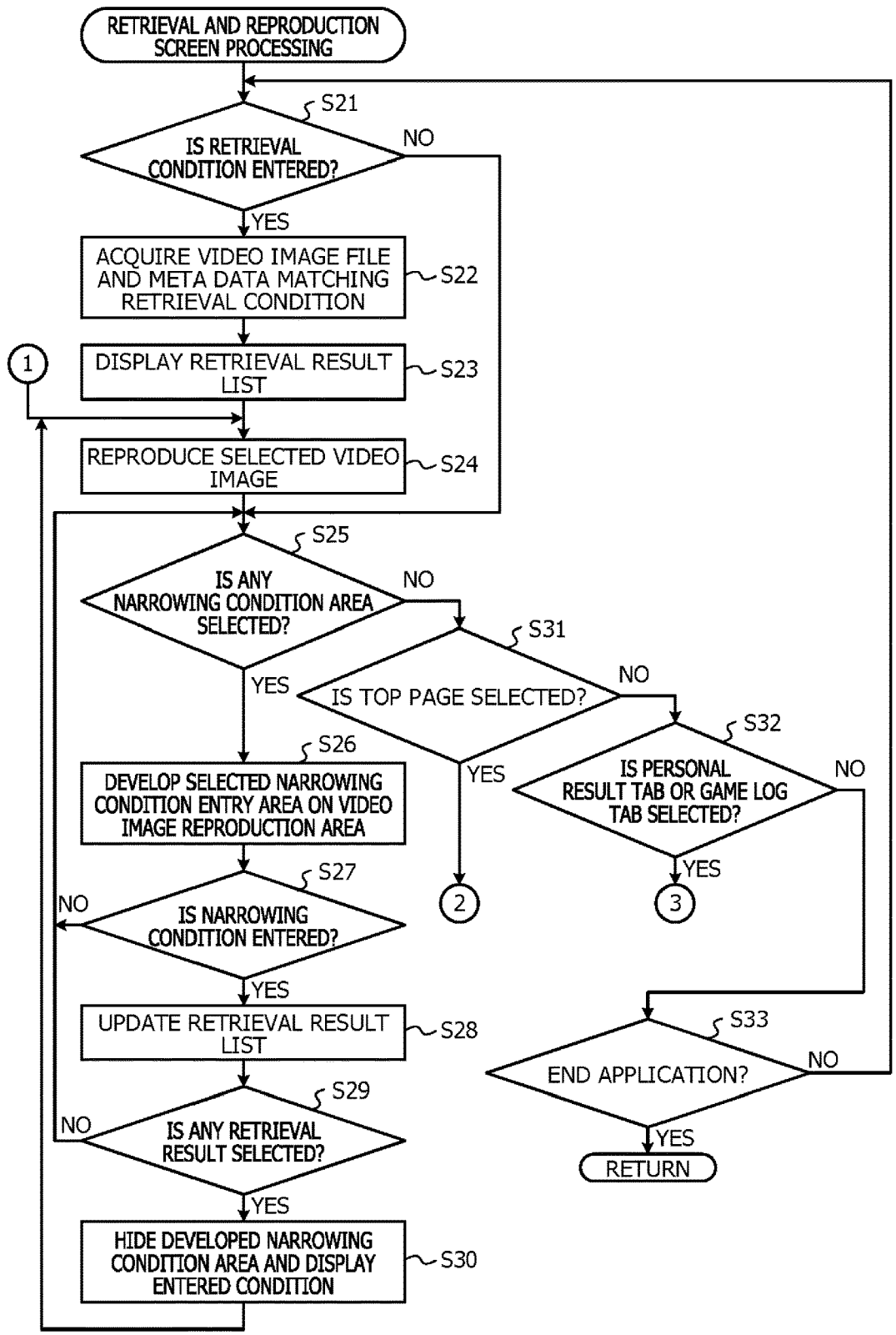
FIG. 22 is a flowchart illustrating an example of a retrieval and reproduction screen processing.

Here, the retrieval and reproduction screen processing is described with reference to FIG. 22.

In the step S21, the display control unit 12 determines whether the retrieval condition is entered in the target player entry area 51, opponent player entry area 52, and pitch/at-bat result entry area 53. When the retrieval conditions are entered in these entry areas, processing proceeds to the step S22, and when the retrieval conditions are not entered, processing proceeds to the step S25.

In the step S22, the display control unit 12 delivers the target player, opponent player, and pitch/at-bat result entered in the respective entry areas to the acquisition unit 11 as the retrieval conditions. Thus, the display control unit 12 acquires the video image file 21 and pitching meta data matching the retrieval conditions, which are distributed from the distribution server 20 via the acquisition unit 11.

Next, in the step S23, the display control unit 12 displays, based on the acquired pitching meta data, a list of retrieval results in the retrieval result list area 56 in a state where each of the retrieval results 56A is selectable.

Next, in the step S24, the display control unit 12 identifies, based on the pitching meta data corresponding to the retrieval result 56A selected in the retrieval result list area 56, the selected pitch scene out of the acquired video image file 21 and starts reproduction in the video image reproduction area 57. In this step, in the case where a retrieval result 56A is selected in a state where the all-pitches display button 56C is not selected, the display control unit 12 sequentially reproduces video images representing pitch scenes included in the at-bat indicated by the retrieval result 56A. In the case where the all-pitches display button 56C is selected and a specific pitch scene is selected from the developed and displayed retrieval results 56A, the display control unit 12 reproduces the video image displaying the selected pitch scene.

In the step S25, the display control unit 12 determines whether any narrowing condition area 55 is selected in the retrieval and reproduction screen 50. When any narrowing condition area 55 is selected, processing proceeds to the step S26, and when no narrowing condition area 55 is selected, processing proceeds to the step S31. In this step, when the game date is entered in the game date entry area 54, the display control unit 12 narrows retrieval results 56A indicated in the retrieval result list area 56 into a retrieval result 56A matching the entered game date.

In the step S26, the display control unit 12, for example, develops and displays a narrowing condition entry area 551 corresponding to the selected narrowing condition area 55 on the video image reproduction area 57 as illustrated in FIGS. 13 to 16.

Next, in the step S27, the display control unit 12 determines whether the OK button 555 is selected with the narrowing condition selected by operating the specifying component 552 in the narrowing condition entry area 551 and thereby determines whether the narrowing condition is entered. When the narrowing condition is entered, processing proceeds to the step S28, and when the narrowing condition is not entered, processing returns to the step S25.

In the step S28, the display control unit 12 narrows retrieval results 56A displayed in the retrieval result list area 56 with the narrowing condition entered in the specifying component 552, and updates display of the retrieval result list area 56.

Next, in the step S29, the display control unit 12 determines whether any retrieval result 56A is selected from the updated retrieval result list area 56. When any retrieval result 56A is entered, processing proceeds to the step S30, and when no retrieval result 56A is entered, processing returns to the step S25. Back to the step S25, when another tab or another narrowing condition area 55 is not selected, the select state of the currently selected narrowing condition area 55 is maintained. Specifically, in the step S26, display state of the narrowing condition entry area 551 developed on the video image reproduction area 57 is maintained.

In the step S30, the display control unit 12 hides display of the narrowing condition entry area 551 developed and displayed on the video image reproduction area 57, and displays the video image reproduction area 57. The display control unit 12 updates display of the narrowing condition area 55 to a display reflecting the condition entered in the specifying component 552. Then, processing returns to the step S24, and reproduction of the video image indicated by the selected retrieval result 56A is started.

Meanwhile, in the step S31, the display control unit 12 determines whether the top page tab 31 is selected on the retrieval and reproduction screen 50. When the top page tab 31 is selected, processing returns to the step S12 of the display control processing (FIG. 21), and the display control unit 12 displays the top page screen 40. When the top page tab 31 is not selected, processing proceeds to the step S32.

In the step S32, the display control unit 12 determines whether the personal result tab 33 or the game log tab 34 is selected on the retrieval and reproduction screen 50. When the personal result tab 33 or game log tab 34 is selected, processing returns to the step S19 of the display control processing (FIG. 21). When neither the personal result tab 33 nor the game log tab 34 is selected, processing proceeds to the step S33, and the display control unit 12 determines whether to end the application. When not ending the application, processing returns to the step S21, and when ending the application, the display control processing ends.

Figure 23:
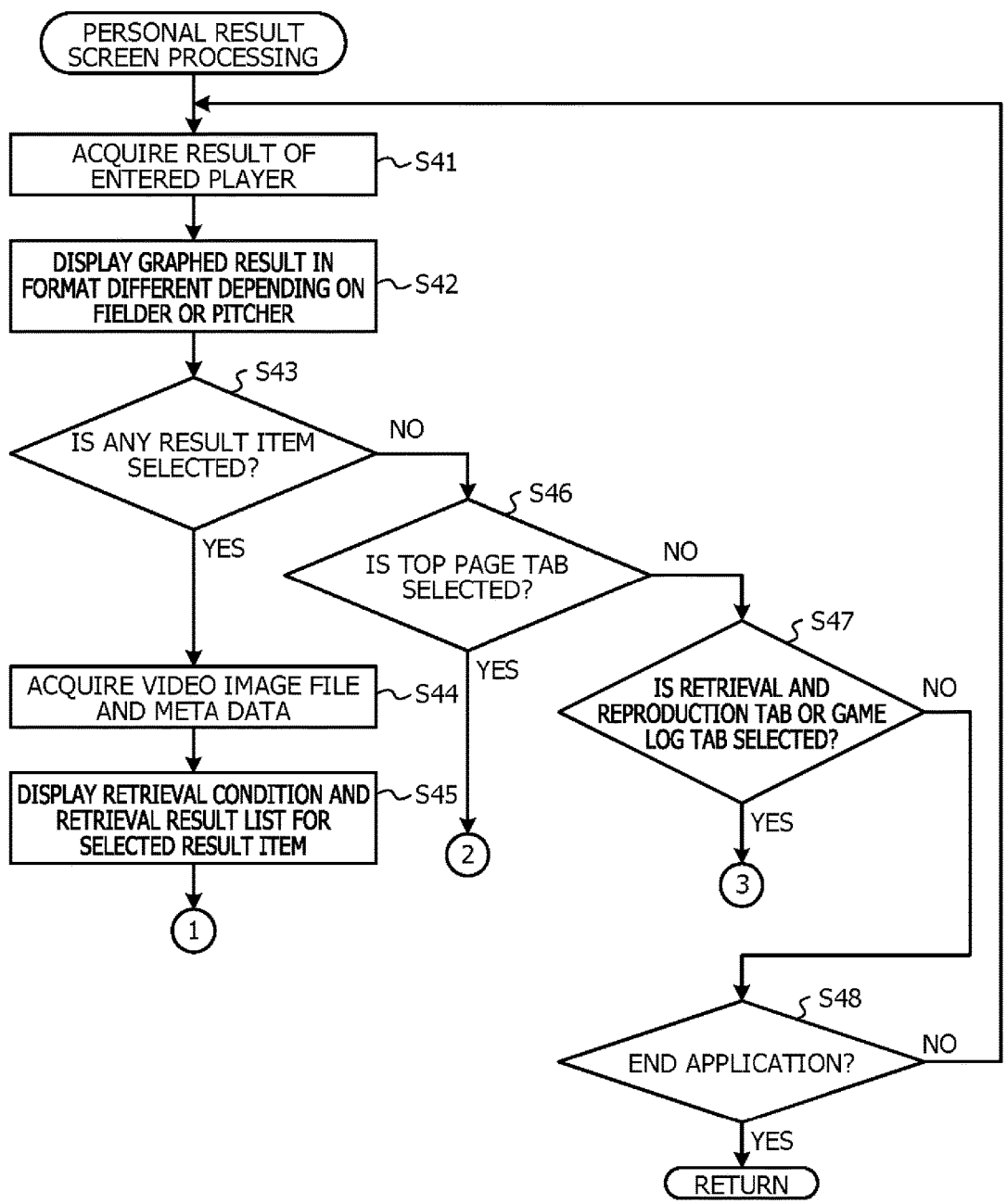
FIG. 23 is a flowchart illustrating an example of a personal result screen processing.

Next, the personal result screen processing is described with reference to FIG. 23.

In the step S41, the display control unit 12 transmits the player ID of the player entered in the target player entry area 61 to the distribution server 20 and acquires result information of the player from the result information table 26 of the distribution server 20. Player information of the log-in user may be established in the target player entry area 61 as a default setting when the screen shifts to the personal result screen 60.

Next, in the step S42, the display control unit 12 displays, based on the acquired result information, the result represented by a graph or a symbol image in the result display area 62 in a different format depending on whether the entered player is a fielder or a pitcher.

Next, in the step S43, the display control unit 12 determines whether any result item is selected by operating the specifying component 63 of any result display area 62. When any result item is selected, processing proceeds to the step S44, and when no result item is selected, processing proceeds to the step S46.

In the step S44, the display control unit 12 delivers the at-bat result, hitting direction, pitching course, pitch type, or count and runner situation corresponding to the selected result item to the acquisition unit 11 as the retrieval condition. Thus, the display control unit 12 acquires the video image file 21 and pitching meta data distributed from the distribution server 20 via the acquisition unit 11.

Next, in the step S45, the display control unit 12 displays a retrieval condition corresponding to the selected result item in each entry area of the retrieval and reproduction screen 50. The display control unit 12 displays, based on the acquired pitching meta data, a list of retrieval results 56A indicating the at-bat corresponding to the selected result item in the retrieval result list area 56. Then, processing proceeds to the step S24 of the retrieval and reproduction screen processing (FIG. 22), and the display control unit 12 starts reproduction of a video image representing the pitch scene included in an at-bat corresponding to the selected result item in the video image reproduction area 57.

Meanwhile, in the step S46, the display control unit 12 determines whether the top page tab 31 is selected on the personal result screen 60. When the top page tab 31 is selected, processing returns to the step S12 of the display control processing (FIG. 21), and the display control unit 12 displays the top page screen 40. When the top page tab 31 is not selected, processing proceeds to the step S47.

In the step S47, the display control unit 12 determines whether the retrieval and reproduction tab 32 or the game log tab 34 is selected on the personal result screen 60. When the retrieval and reproduction tab 32 or the game log tab 34 is selected, processing returns to the step S19 of the display control processing (FIG. 21). When neither the retrieval and reproduction tab 32 nor the game log tab 34 is selected, processing proceeds to the step S48, and the display control unit 12 determines whether to end the application. When not ending the application, processing returns to the step S41, and when ending the application, the display control processing ends.

Figure 24:
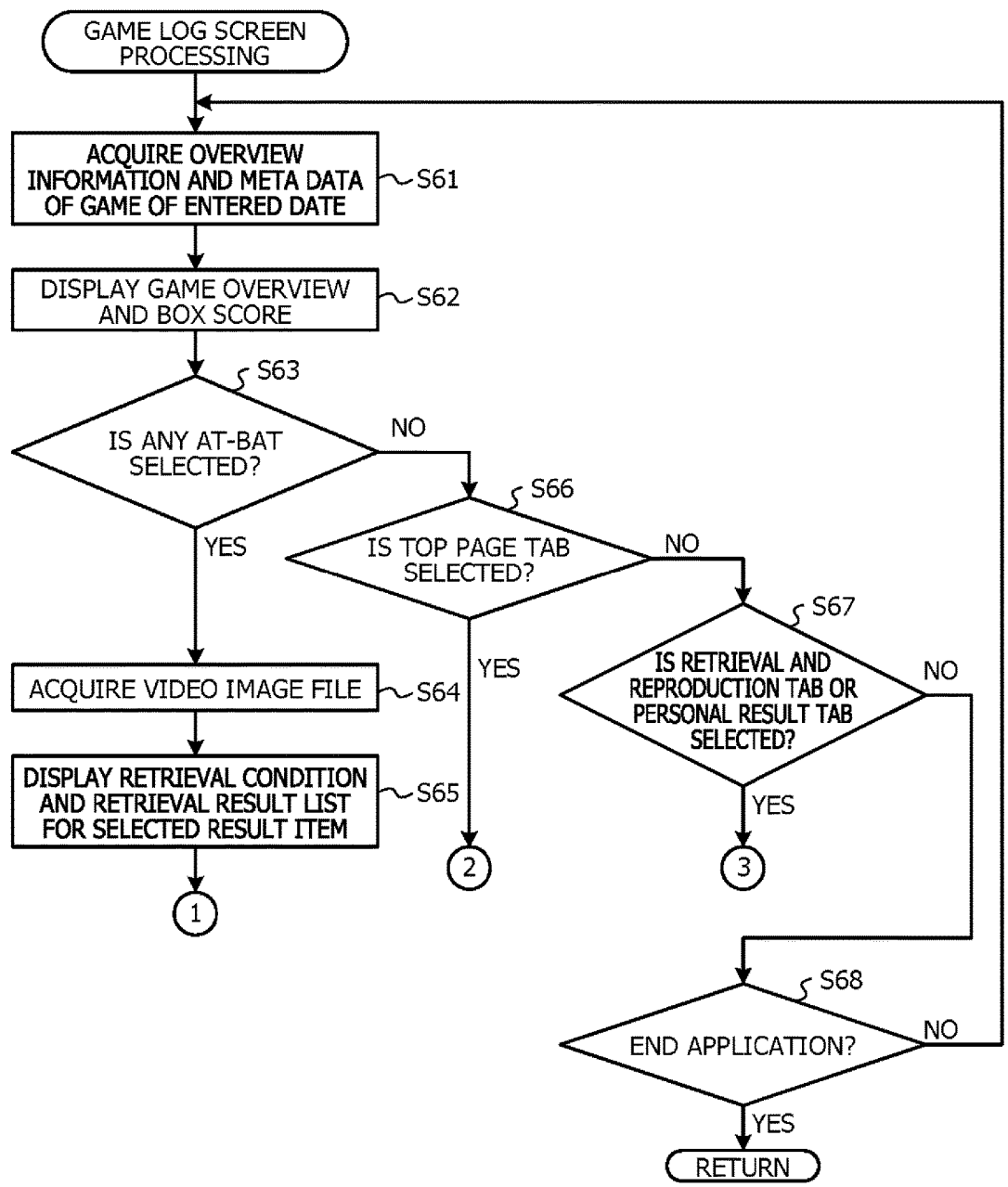
FIG. 24 is a flowchart illustrating an example of a game log screen processing.

Next, the game log screen processing is described with reference to FIG. 24.

In the step S61, the display control unit 12 switches the screen to the game log screen 70 and transmits the game date entered in the game date entry area 71 to the distribution server 20. Then, the display control unit 12 acquires the game information and pitching meta data of the game identified based on the entered game date and the team to which the log-in user belongs. Also, the game of a team other than the team to which the log-in user belongs may be entered.

Next, in the step S62, the display control unit 12 displays the content of the acquired game information in the game overview display area 73 in a predetermine format. The display control unit 12 displays, based on the acquired pitching meta data, a box score from which each frame (each at-bat) is selectable, in the box score display area 74.

Next, in the step S63, the display control unit 12 determines whether any frame (at-bat) is selected from the box score. When any at-bat is selected, processing proceeds to the step S64, and when no at-bat is selected, processing proceeds to the step S66.

In the step S64, the display control unit 12 delivers the pitching meta data of the selected at-bat to the acquisition unit 11 as the retrieval condition. Thus, the display control unit 12 acquires the video image file 21 distributed from the distribution server 20 via the acquisition unit 11.

Next, in the step S65, the display control unit 12 extracts pitching meta data of the at-bat selected in the above step S63 from the pitching meta data acquired in the above step S61, and displays the retrieval condition based on the extracted pitching meta data in each entry area of the retrieval and reproduction screen 50. The display control unit 12 displays, based on the extracted pitching meta data, a retrieval result 56A indicating an at-bat matching the selected at-bat in the retrieval result list area 56. Then, processing proceeds to the step S24 of the retrieval and reproduction screen processing (FIG. 22), and the display control unit 12 starts, in the video image reproduction area 57, reproduction of a video image displaying the pitch scene included in an at-bat selected from the box score.

Meanwhile, in the step S66, the display control unit 12 determines whether the top page tab 31 is selected on the game log screen 70. When the top page tab 31 is selected, processing returns to the step S12 of the display control processing (FIG. 21), and the display control unit 12 displays the top page screen 40. When the top page tab 31 is not selected, processing proceeds to the step S67.

In the step S67, the display control unit 12 determines whether the retrieval and reproduction tab 32 or the personal result tab 33 is selected on the game log screen 70. When the retrieval and reproduction tab 32 or the personal result tab 33 is selected, processing returns to the step S19 of the display control processing (FIG. 21). When neither the retrieval and reproduction tab 32 nor the personal result tab 33 is selected, processing proceeds to the step S68, and the display control unit 12 determines whether to end the application. When not ending the application, processing returns to the step S61, and when ending the application, the display control processing ends.

When any button of the reproduction control button group 58 is selected while the video image is being reproduced in the above step S24, the display control unit 12 performs reproduction control matching the selected button. When a message assigning button (not shown) is selected during reproduction of the video image, upon receiving a message from the user, the display control unit 12 assigns the received message to a pitch scene indicated by the video image being reproduced. The message assigned to the pitch scene is not limited to a character message using a text data, but may be a tag indicating approval or sympathy such as a "great!" button widely used in applications of the social networking service (SNS).

As illustrated above, when a predetermined retrieval condition (narrowing condition) is entered, the display controller according to the embodiment displays an input area for entering the retrieval condition in the video image reproduction area and updates a list of retrieval results according to the entered predetermined retrieval condition. When any retrieval result is displayed, the display controller does not display the input area for entering a predetermined retrieval condition, displays the video image reproduction area and reproduces a video image indicated by the selected retrieval result. During this operation, unselected retrieval results remain displayed in the retrieval result list. Thus, the predetermined retrieval condition may be entered easily, and retrieval results other than those corresponding to a video image being reproduced may be recognized. Thereby, operability in retrieving the video image is improved.

As the entry state of a predetermined retrieval condition is represented by a symbol image, the entry state of the retrieval condition may be recognized intuitively.

The number of retrieval results hitting the selection candidate is also displayed for each of retrieval conditions, and may be used as a reference for entering the retrieval condition. Thus, retrieval operability is improved.

Retrieval results are displayed in the retrieval result list based on the at-bat including a pitch scene matching the retrieval condition. This facilitates checking of the video image of not only pitch scenes matching the retrieval condition, but also pitch scenes included in the same at-bat such as those before and after the pitch scene matching the retrieval condition. Display of the retrieval result is not limited to the at-bat basis, but an inning including the pitch scene matching the retrieval condition may be displayed as one retrieval result. In this case, flow of the attack in the inning including the pitch scene matching the retrieval condition may be checked.

In this embodiment, the screen may be shifted from each at-bat of the box score indicating results in various situations and game results directly to video image reproduction. Therefore, the result and the video image of each at-bat may be retrieved without paying attention to entering of the retrieval condition.

In the above embodiment, the video image file is acquired at a timing when a performance card or a recent at-bat on the top page screen, a player or result in the retrieval and reproduction screen, a result item on the personal result screen or an at-bat of the box score on the game log screen is entered. However, the timing of acquiring the video image file is not limited thereto, but may be a timing when the retrieval condition is entered from the retrieval condition list, or a timing when a specific retrieval condition is entered. The video image file may be acquired not based on the video image file, but by capturing a partial image just covering the pitch scene matching the retrieval condition or a partial image including the pitch scene and cut in the unit of at-bat or inning.

In the above embodiment, the narrowing condition entry area is developed and displayed so as to superpose across the video image reproduction area. However, the narrowing condition entry area may superpose a part of the video image reproduction area. A default retrieval and reproduction screen may display any narrowing condition entry area, and when a retrieval result is selected, a video image reproduction area may be formed in a whole or a part of the narrowing condition entry area, and then, a video image indicated by the selected retrieval result may be reproduced therein.

In the above embodiment, the display controller generates a performance card therein based on the acquired top page information, but the method of generating the performance card is not limited thereto. The performance card may be generated by the distribution server and transmitted to the display controller.

In the above embodiment, the retrieval target is each pitch scene of the baseball game video image. However, the retrieval target may be a scene segmented in another unit such as an at-bat unit or inning unit. In this case, similarly with the pitch tag of the above embodiment, a tag may be assigned for a segment of the at-bat and inning, and information on a scene starting from a frame to which the tag is assigned may be prepared as meta data.

The video image of the retrieval target is not limited to the baseball game video image, but may be a video image assigned with information which is segmented as a scene in a predetermined unit and becomes a selection candidate of the retrieval condition for each scene. Retrieval target is not limited to the video image, but may be a still picture.

In the above embodiment, the display control program 90 is pre-stored (installed) in the storage unit 83. However, the display control program 90 may be provided in a form recorded into a removable medium such as CD-ROM and DVD-ROM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a display control program that causes a computer to execute a process, the process comprising:
    in response to a selection of a retrieval item from a plurality of retrieval items, displaying, on a reproduction area of a display screen, an input area of a retrieval condition corresponding to the selected retrieval item, the reproduction area being an area for reproducing an image or a video image;
    displaying, in an area different from the input area on the display screen, a retrieval result retrieved according to a retrieval condition entered in the input area, while maintaining the display of the input area;
    receiving a selection of any content from a plurality of contents included in the displayed retrieval results; and
    in response to the selection of the content, displaying, on the reproduction area, the image or the video image corresponding to the selected content while maintaining the display of the retrieval results, the reproduction area overlapping at least a part or a whole of the input area, the input area being hidden in response to displaying the reproduction area.

2. The non-transitory computer-readable storage medium according to claim 1, wherein each of the plurality of retrieval items includes a symbol image representing an entry state of the condition corresponding to the retrieval item.

3. The non-transitory computer-readable storage medium according to claim 2, wherein
the symbol image includes an image representing at least one of a pitching zone, a pitch type, a hitting direction, a ball count, an out count, or on-base situation of runner, of a baseball.

4. The non-transitory computer-readable storage medium according to claim 1, wherein
the input area displays a plurality of selectable candidates in association with number of contents matched with each of the plurality of selectable candidates.

5. The non-transitory computer-readable storage medium according to claim 1, wherein the process further comprises:
displaying, in response to a reception of a predetermined instruction for a specified content included in the retrieval result, another item, both the specified content and another content corresponding to a specified inning.

6. The non-transitory computer-readable storage medium according to claim 1, wherein the process further comprises:
displaying another item in response to a reception of a predetermined instruction for a specified content included in the retrieval result when an image or a video image corresponding to the specified content is an image or a video image of a pitch scene in a baseball game, both the specified content and another content corresponding to a specified at-bat.

7. The non-transitory computer-readable storage medium according to claim 6, wherein
the other content is a content not satisfying the retrieval condition entered in the input area.

8. The non-transitory computer-readable storage medium according to claim 1, wherein the process comprises:
when the image or the video image is an image or a video image concerning a baseball game, displaying a result regarding a specified player, the result including a situation of a pitching zone, a pitch type, a hitting direction, a ball-count and out-count, or an on-base situation of runner; and
when any item included in the result is selected, displaying image or a video image corresponding to a content retrieved based on a condition corresponding to the selected item included in the result.

9. The non-transitory computer-readable storage medium according to claim 1, wherein the process comprises:
when the image or the video image is an image or a video image concerning a baseball game, displaying a list of an inning-based at-bat result of each batter for a designated game; and
when any at-bat result included in the list is selected, displaying an image or a video image corresponding to the selected at-bat result.

10. A display control device comprising:
a memory; and
a processor coupled to the memory and the processor configured to:
in response to a selection of a retrieval item from a plurality of retrieval items, display, on a reproduction area of a display screen, an input area of a retrieval condition corresponding to the selected retrieval item, the reproduction area being an area for reproducing an image or a video image;
display, in an area different from the input area on the display screen, a retrieval result retrieved according to a retrieval condition entered in the input area, while maintaining the display of the input area;
receive a selection of any content from a plurality of contents included in the displayed retrieval results; and
in response to the selection of the content, display, on the reproduction area, the image or the video image corresponding to the selected content while maintaining the display of the retrieval results, the reproduction area overlapping at least a part or a whole of the input area, the input area being hidden in response to displaying the reproduction area.

* * * * *